US012212903B2

(12) United States Patent
Pandey et al.

(10) Patent No.: US 12,212,903 B2
(45) Date of Patent: Jan. 28, 2025

(54) DYNAMIC CROSS-FREQUENCY PATH CONFIGURATION FOR WAVELENGTH DIVISION MULTIPLEXING NETWORKS

(71) Applicants: AT&T Intellectual Property I, L.P., Atlanta, GA (US); AT&T Communications Services India Private Limited, Bangalore (IN)

(72) Inventors: Mritunjay Pandey, Bangalore (IN); Subhash Kapoor, Wall, NJ (US); Lynn Rivera, Leesburg, VA (US); Saurav Paira, Dayton, NJ (US)

(73) Assignees: AT&T Intellectual Property I, L.P., Atlanta, GA (US); AT&T Communications Services India Private Limited, Karnataka (IN)

( * ) Notice: Subject to any disclaimer, the term of this patent is extended or adjusted under 35 U.S.C. 154(b) by 122 days.

(21) Appl. No.: 18/061,681

(22) Filed: Dec. 5, 2022

(65) Prior Publication Data
US 2024/0187762 A1 Jun. 6, 2024

(51) Int. Cl.
*H04J 14/00* (2006.01)
*H04B 10/27* (2013.01)
(Continued)

(52) U.S. Cl.
CPC ......... *H04Q 11/0062* (2013.01); *H04B 10/27* (2013.01); *H04J 14/0201* (2013.01); *H04Q 2011/009* (2013.01)

(58) Field of Classification Search
CPC ........... H04Q 11/0062; H04Q 11/0066; H04Q 11/0067; H04Q 11/0005; H04J 14/02;
(Continued)

(56) References Cited

U.S. PATENT DOCUMENTS 10,547,384 B2  1/2020  Choudhury et al.
10,686,544 B2  6/2020  Birk et al.
(Continued)

OTHER PUBLICATIONS

"Key Recommendations for Optical Channel Planning in Flex-Grid ROADM Networks", https://thecinict.com/2021/01/21/key-recommendations-for-optical-channel-planning-in-flex-grid-ROADM-networks, 2021, 7 pages.
(Continued)

*Primary Examiner* — Hanh Phan
(74) *Attorney, Agent, or Firm* — Guntin & Gust, PLC; Miyoung Shin

(57) ABSTRACT

Aspects of the subject disclosure may include, for example, identifying network elements of a wavelength division multiplexing (WDM) domain of an optical waveguide communication system that includes a group of optical-add-drop multiplexor (OADM) devices. Operations are observed for the WDM domain configured to deliver communication services configured for simultaneously transporting independent signals across a network of single optical waveguides. A demand for optical waveguide communication services is determined and the WDM network is configured according to the optical fiber communication link requirement and according to the observations. The configured WDM network includes at least one OADM device of the group of OADM devices configured to provide a WDM cross-frequency network path of the configured WDM network. Other embodiments are disclosed.

20 Claims, 12 Drawing Sheets

(51) Int. Cl.
*H04J 14/02* (2006.01)
*H04Q 11/00* (2006.01)

(58) Field of Classification Search
CPC .. H04J 14/0201; H04J 14/0202; H04J 14/021; H04B 10/0795; H04B 10/07953; H04B 10/071; H04B 10/07955; H04B 10/2507
USPC .... 398/79, 83, 45, 48, 49, 158, 159, 33, 38, 398/25, 26, 27, 59
See application file for complete search history.

(56) References Cited

U.S. PATENT DOCUMENTS

| | | | |
|---|---|---|---|
| 10,727,973 B1* | 7/2020 | Kumar | H04L 45/64 |
| 10,771,152 B2 | 9/2020 | Bouda | |
| 10,778,517 B2 | 9/2020 | Clark et al. | |
| 10,873,411 B1 | 12/2020 | Marenco et al. | |
| 10,887,190 B2 | 1/2021 | Clark et al. | |
| 11,070,286 B1 | 7/2021 | Shiner et al. | |
| 11,095,389 B2 | 8/2021 | Elby et al. | |
| 11,894,872 B2* | 2/2024 | Acharjee | H04B 10/272 |
| 2017/0230267 A1 | 8/2017 | Armolavicius et al. | |
| 2018/0367214 A1* | 12/2018 | Woodward | H04J 14/0271 |
| 2019/0173602 A1 | 6/2019 | Al Sayeed et al. | |
| 2020/0021358 A1 | 1/2020 | Maccaglia et al. | |
| 2020/0067599 A1 | 2/2020 | Ward | |
| 2020/0067772 A1 | 2/2020 | Tomkins et al. | |
| 2020/0092026 A1 | 3/2020 | Birk et al. | |
| 2021/0050915 A1 | 2/2021 | Lee et al. | |
| 2021/0175993 A1 | 6/2021 | Liu et al. | |
| 2022/0131627 A1 | 4/2022 | Beacall et al. | |

OTHER PUBLICATIONS

"The Role of Transponders and Muxponders in Fiber Optic Networks", smartoptics, https://www.smartoptics.com/this-is-wdm/the-role-of-transponders-and-muxponders-in-fiber-optic-networks, 2022, 5 pages.

"What is ROADM?", https://www.ciena.com/products, 2022, 15 pages.

Farrel, A. et al., "An Architecture for Use of PCE and PCEP in a Network with Central Control", TEAS Working Group, draft-ietf-teas-pce-central-control-05, Sep. 4, 2017, 29 pages.

Gandluru, Muralikrishna, "Optical Networking and Dense Wavelength Division Multiplexing (DWDM)", Nov. 24, 1999, 22 pages.

Lopez, V. et al., "Path Computation Element in Telecom Networks: Recent Developments and Standardization Activities", High Performance Computing and Networking group, University Autonoma of Madrid, 6 pages, 2009.

Sequeira, Allwyn, "The Software-defined Data Center (SDD), SDN, Network Virtualization", vmware; https://octo.vmware.com/the-software-defined-data-center-sdd-sdn-network-virtualization, May 10, 2012, 5 pages.

* cited by examiner

260

265

DYNAMIC CROSS-FREQUENCY PATH CONFIGURATION FOR WAVELENGTH DIVISION MULTIPLEXING NETWORKS

FIELD OF THE DISCLOSURE

The subject disclosure relates to a dynamic cross-frequency path configuration for wavelength division multiplexing networks.

BACKGROUND

Wavelength division multiplexing (WDM) is a fiber-optic transmission technique that enables the use of multiple light wavelengths (or colors) to send data over the same optical fiber. An application of WDM allows a single optical waveguide to support multiple communication channels. Each channel utilizes a respective optical carrier operating at different respective wavelengths or frequencies on the optical spectrum. Accordingly, two or more colors of light can travel on one fiber, simultaneously, to provide contentionless sharing of the same waveguide.

Standards have been developed to facilitate commercial adoption of WDM, e.g., enabling equipment from different vendors to interoperate. Broadly, WDM applications may be distinguished between coarse WDM (CWDM) and dense WDM (DWDM). Generally, CWDM refers to WDM systems with fewer than eight active wavelengths per fiber. For example, CWDM may be employed for short-range communications, providing relatively wide-range frequencies having wavelengths that are spread far apart. Alternatively, DWDM refers to WDM systems having tighter wavelength spacing to accommodate more channels onto a single fiber. To this end, DWDM partition an operational spectrum in a finer manner, e.g., fitting 40 or more channels into what is referred to as a C-band frequency range.

In some applications, the DWDM may operate according to a fixed operational channel grid. Example grids may accommodate 40, 88, or 96 wavelengths at fixed spacings into the C-band spectrum of a fiber. Other applications permit the DWDM to operate according to flexible channel plans. Such plans may be referred to as having a flexible grid, or even a gridless pattern that may accommodate anything from 64 75 GHz wide channels, or 40-45 channels at higher line rates, e.g., up to 800 GHz or higher. A gridless architecture generally supports channels according to some minimum size, e.g., 37.5 GHZ, with adjustable increments having a predetermined resolution, e.g., 6.25 GHz. A DWDM deployment utilizing a flexible grid provides a network service provider with an ability to support multiple generations of transponders independent of format, bit rate, symbol rate, etc.

BRIEF DESCRIPTION OF THE DRAWINGS

Reference will now be made to the accompanying drawings, which are not necessarily drawn to scale, and wherein.

Figure 1:
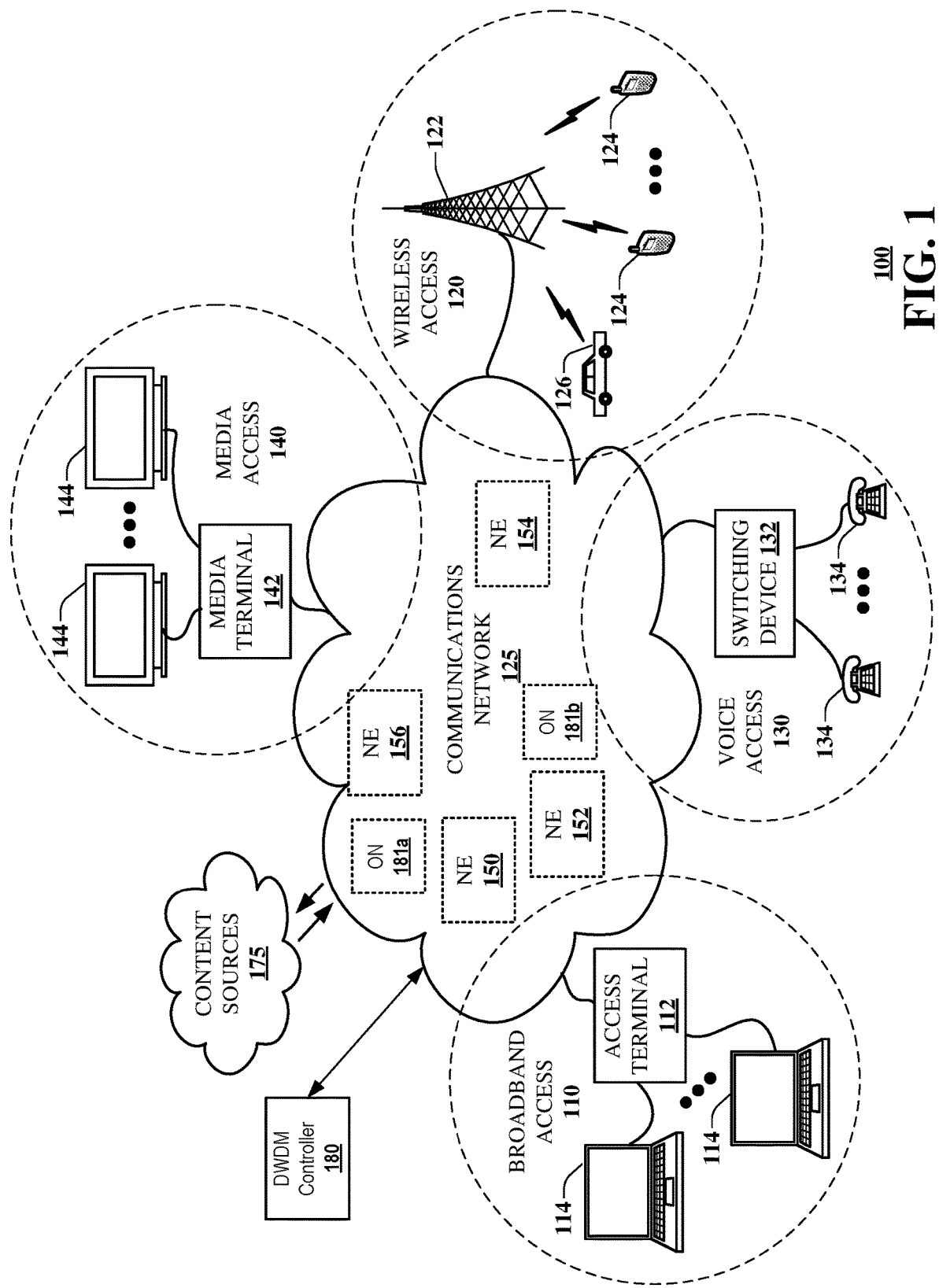
FIG. 1 is a block diagram illustrating an exemplary, non-limiting embodiment of a communications network in accordance with various aspects described herein.

The subject disclosure describes, among other things, illustrative embodiments for discovering a network topology of an optical waveguide communication system configured according to a WDM network arrangement, for identifying a WDM network path configured to support an end-to-end communication requirement. The WDM network arrangement supports multiple independent channels arranged at respective channel frequencies that share at least one common optical fiber segment. Preferably, optical add-drop multiplexors (OADM) may be utilized to facilitate configurability of network paths without necessarily requiring electro-optical conversions at intermediate WDM network nodes. The WDM network includes an intelligent controller that identifies operational parameters of the OADM nodes and applies a machine learning based on measured and/or estimated performance of the WDM network. The WDM network controller applies one or more rules and/or policies to identify a network path based on the machine learning. Other embodiments are described in the subject disclosure.

One or more aspects of the subject disclosure include a process that includes a process that includes discovering, by a processing system including a processor, a network topology of a wavelength division multiplexing (WDM) domain of an optical fiber communication system. The WDM domain includes multiple optical-add-drop multiplexor (OADM) devices that are configured for simultaneously transporting a number of independent light signals across a single optical fiber network. The process further includes obtaining, by the processing system, a number of observations of operation of the WDM domain configured to transport a number of communication channels via a least one OADM device of the plurality of OADM devices. An optical fiber communication link requirement is identified, by the processing system, for an optical fiber communication link between a source end and a destination end. The WDM network is configured, by the processing system, according to the optical fiber communication link requirement and according to the number of observations, wherein the configured WDM network includes the at least one OADM device of the multiple OADM devices configured to provide a WDM cross-frequency network path of the configured WDM network.

One or more aspects of the subject disclosure include a device, having a processing system including a processor and a memory that stores executable instructions. The executable instructions, when executed by the processing system, facilitate performance of operations that include discovering a network topology of wavelength division multiplexing (WDM) domain of an optical fiber communication system. The WDM domain includes a number of optical-add-drop multiplexor (OADM) devices configured for simultaneously transporting multiple independent light signals across a single optical fiber network. The operations further include observing operation of the WDM domain, wherein the WDM domain is configured to transport multiple communication channels via a least one of the number of OADM devices. A demand is determined for an optical fiber communication link between a source end and a destination end and the WDM network is configured according to the optical fiber communication link requirement and according to the observations. The configured WDM network includes the at least one of the number of OADM devices configured to provide a WDM cross-frequency network path of the configured WDM network.

One or more aspects of the subject disclosure include a machine-readable medium, including executable instructions that, when executed by a processing system including a processor, facilitate performance of operations. The operations include identifying network elements of a wavelength division multiplexing (WDM) domain of an optical waveguide communication system that includes optical-add-drop multiplexor (OADM) devices. Operations are observed of the WDM domain configured to deliver communication services configured for simultaneously transporting independent signals across a network of single optical waveguides. A demand for optical waveguide communication services is determined and the WDM network is configured according to the optical fiber communication link requirement and according to the observations. The configured WDM network includes at least one OADM device of the plurality of OADM devices configured to provide a WDM cross-frequency network path of the configured WDM network.

Without limitation, the policies and/or rules applied by the WDM controller in identifying network paths may be based on one or more of a channel location that may include a particular operational band, e.g., C band spectrum and/or L band spectrum, a particular channel wavelength, e.g., based on channel availability, bandwidth requirements, interoperability with other channels, e.g., to reduce and/or eliminate gaps in a channel spectrum. Alternatively, or in addition, the policies and/or rules may be based on other considerations, such performance parameters of an optical fiber and/or another network device, such as optical fiber characteristics, gain profile of erbium-doped fiber amplifiers (EDFA), absorption losses, scatterings, e.g., Rayleigh and/or Mic scatterings, dispersion profile, e.g., chromatic and/or polarization, distances between transponders, mux-ponders and/or switch-ponders as may be used in electro-optical conversions along an end-to-end network path. In at least some embodiments, the policies and/or rules applied by the WDM controller in identifying network paths may be based on one or more of case of implementation, minimizing the use of any transponders, mux-ponders and/or switch-ponders, implementation and/or operational cost efficiencies, available spectrum, channel bandwidth requirements, error tolerance, power consumption, and so on.

Referring now to FIG. 1, a block diagram is shown illustrating an example, non-limiting embodiment of a communication system 100 in accordance with various aspects described herein. For example, the communication system 100 can facilitate in whole or in part discovering a network topology of a WDM network having reconfigurable optical add-drop multiplexor nodes (ROADMs) configured for operation in fiberoptic communications network, identifying operational parameters of OADM nodes, and applying a machine learning approach to train a model based on observations of WDM network performance in view of the discovered topology and operational parameters. The trained model may be used to identify and/or otherwise recommend a WDM cross-frequency network path. A configuration of the WDM, including operating channels and/or bandwidth may be determined according to the trained model to address a communication requirement.

A communications network 125 is presented for providing broadband access 110 to a plurality of data terminals 114 via access terminal 112, wireless access 120 to a plurality of communication devices, referred to generally as user equipment (UE). Without limitation, UE may include one or more of mobile telephones, tablet devices, e-readers, laptop computers, smart watches, desktop computers, Internet of Things ("IoT") devices, Machine-to-Machine ("M2M") devices, and/or other types of devices that may be mobile and/or stationary. According to the illustrative example, the UE include mobile devices 124 and vehicle(s) 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the communications network 125 includes optical fiber networks 181a, 181b, generally 181, configured to transport information that may be generated by and/or otherwise consumed and/or accessed by one or more of the example access systems 110, 120, 130, 140. In at least some instances, information exchanged with one or more of the access systems may be consolidated, e.g., according to packet communications, and exchanged over one or more transport systems that may include the optical fiber network 181. The optical fiber network 181 may include one or more nodes, which may include access nodes and/or relay nodes. Information may be added to and/or extracted from the optical fiber network 181 via one or more of the access nodes. In at least some embodiments, the optical fiber network 181 may include a WDM system or network in which independent optical fiber channels may be transported across the same optical fiber in a contentionless manner by utilizing different optical carrier wavelengths or channels.

A WDM network may be characterized according to a coarse WDM (CWDM) technology, e.g., as described in ITU-T G.695 and/or a dense WDM (DWDM) technology, e.g., as described in ITU-T G.671. A WDM network may include one or more network elements, such as an optical multiplexor (OM), an optical demultiplexer (OD), an optical add-drop multiplexer (OADM), and one or more optical fibers interconnecting the various network elements. A WDM link may be established between two endpoints. In at least some embodiments, the link is directional in that one end of the directional link includes one or more light source, e.g., LEDs and/or laser diodes, while the other end includes one or more light detectors, e.g., photodetector diodes. One or more of the light sources may be configured to emit light at a particular wavelength. In some embodiments, multiple light sources may be fixed tuned, emitting light at different wavelengths within a predetermined bandwidth of an optical channel, e.g., an optical fiber. Alternatively, or in addition, one or more of the light sources may be tunable to emit light at a tuned wavelength within a tunable wavelength range. It is understood that a single optical fiber may accommodate multiple directional links operated at respective wavelengths. At least some of the links may be bidirectional at the same wavelength, e.g., according to time division diversity scheme. Alternatively, or in addition, some of the links may be bidirectional at different wavelengths according to a wavelength diversity scheme.

An example CWDM wavelength diversity scheme utilizes a fixed number of optical channels having a channel bandwidth up to some maximum value, e.g., up to 16 channels, each capable of accommodating up to 50 Gbps. It is understood that optical fibers may vary, e.g., depending upon whether they are designed for short-haul or long-haul applications. Short-haul applications may include metro networks, while long-haul applications may include regional, national and/or trans-oceanic links. In some applications, WDM channels may be fixed, e.g., having a nominal central wavelength and channel width. Alternatively, or in addition, other applications may have flexible channel assignments.

The example communication system 100, includes an optical fiber domain controller 180. The optical fiber domain controller 180 may be in communication with one or more of the optical fiber networks 181 and adapted to monitor, configure and/or otherwise control operation of one or more aspects of the optical fiber networks 181. To this end, one or more of the optical fiber networks 181 may be in communication with an optical fiber domain controller 180. The optical fiber domain controller 180 may be configured to implement in whole or in part, a discovering of a network topology of the optical fiber networks 181, for identifying operational parameters of WDM applications, and for applying a machine learning approach to train a model based on observations of performance of a WDM of the optical fiber networks 181 in view of the discovered topology and operational parameters. A configuration of the WDM of the optical fiber networks 181, including operating channels, frequencies, wavelengths and/or bandwidth may be determined according to the trained model to address a transport requirement to be serviced by the optical fiber network 181. Transport requirements may include, without limitation, access points, including "add" and "drop" locations, bandwidths, latencies, subscription levels, customer identities and/or application types.

Figure 2A:
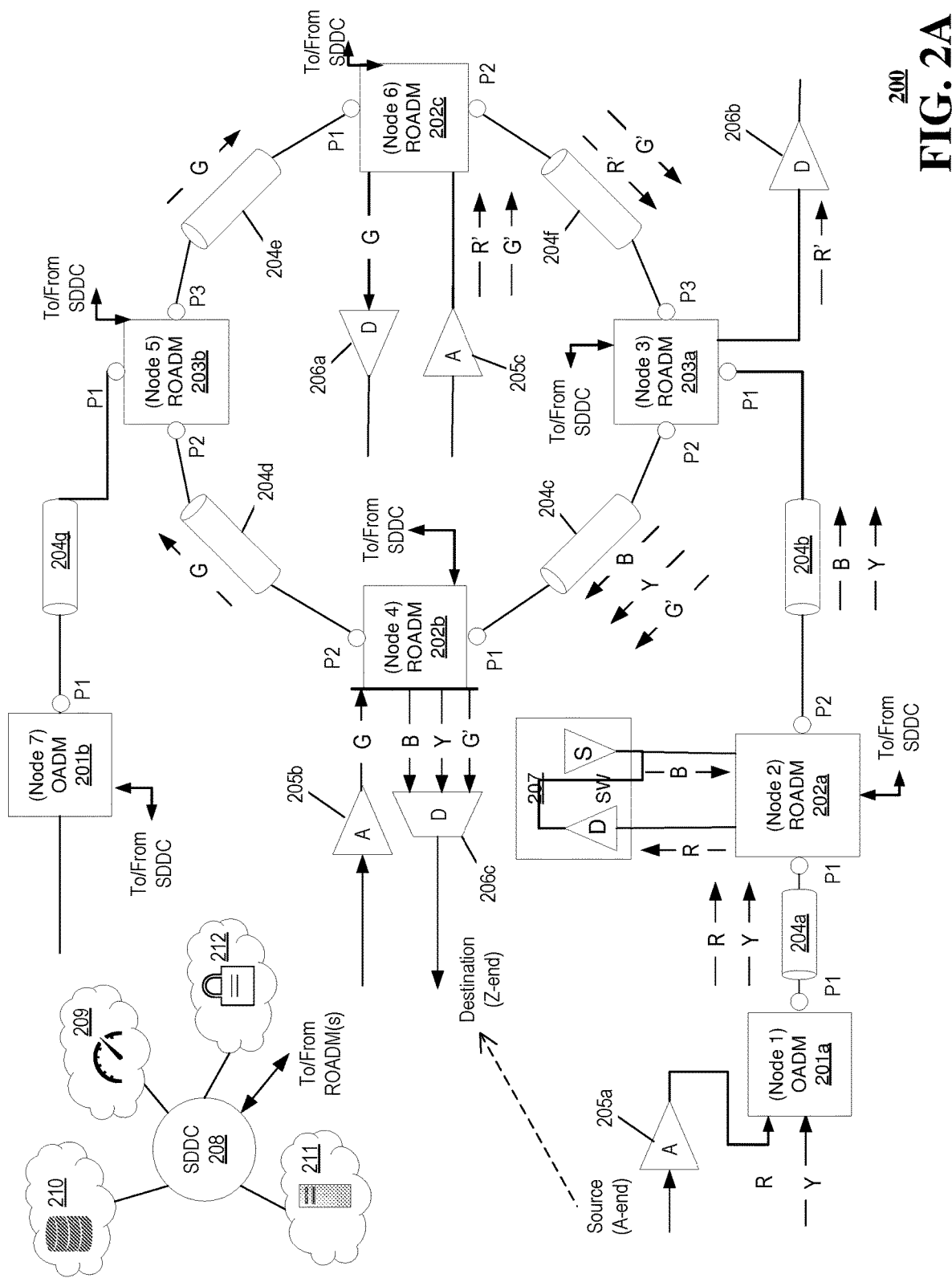
FIG. 2A is a block diagram illustrating an example, non-limiting embodiment of an optical waveguide communication system functioning within the communication network of FIG. 1 in accordance with various aspects described herein.

FIG. 2A is a block diagram illustrating an example, non-limiting embodiment of an optical waveguide communication system 200 functioning within the communication system 100 of FIG. 1 in accordance with various aspects described herein. The optical waveguide communication system 200 is configured to support an exchange of information via lightwave communications over one or more optical waveguides. Lightwave communications may include photon generation, detection, and/or manipulation through one or more of emission, transmission, modulation, signal processing, switching, amplification, and sensing. In at least some applications, lightwave communications includes modulation of a lightwave carrier signal. The carrier signal may include an electromagnetic wave having a wavelength occurring in an optical portion of the electromagnetic spectrum. An optical portion or region of the electromagnetic spectrum includes wavelengths visible to the human eye, as well as other regions that extend into the ultraviolet and/or infrared regions.

Optical waveguides include physical structures that guide electromagnetic waves in what may be referred to as an optical region of the electromagnetic spectrum. Example waveguide structures may include, without limitation, optical fiber waveguides, transparent dielectric waveguides, e.g., made of plastic and glass, liquid light guides, and/or liquid waveguides. At least some optical waveguides include semiconductor optical waveguide devices configured to transfer optical information between different photonic devices. The systems, processes and techniques disclosed herein may be employed to one or more optical waveguide structures, alone or in any combination.

According to a transmission loss profile of silica fibers, optical fiber telecommunications may be supported in an optical band defined by low-loss characteristics extending between about 1260 nm to about 1625 nm. This region has been subdivided into different bands, referred to as: O-band, extending from about 1260 nm to about 1360 nm; E-band, extending from about 1360 nm to about 1460 nm; S-band, extending from about 1460 nm to about 1530 nm, C-band, extending from about 1530 nm to about 1565 nm; and L-band, extending from about 1565 nm to about 1625 nm.

It has been recognized that an information carrying capacity and/or flexibility may be enhanced by employing a wavelength division multiplexing (WDM) scheme in which multiple optical carrier signals operating at different carrier wavelengths may occupy the same optical waveguide structure to independently convey respective bundles of information. A frequency grid may be determined to apportion the available optical waveguide channel spectrum into different channels that may be utilized to promote an efficient utilization of the optical waveguide. By way of example, a frequency grid may include a table of frequencies, e.g., central frequencies and corresponding wavelengths, of allowed channels. Alternatively, or in addition, a frequency grid may include a bandwidth and/or range of bandwidths available for allocation to supported optical waveguide links. At least one example frequency grid, referred to as dense wavelength division multiplexing (DWDM) is defined by ITU-T G.694.1. The example DWDM grid is defined relative to 193.1 THz and extends from about 191.7 THz to about 196.1 THz with 100 GHz channel spacing. Alternatively, a frequency grid may be expressed in terms of wavelengths. For example, the DWDM grid covers the wavelength range from about 1528.77 nm to about 1563.86 nm with approximately a 0.8 nm channel spacing.

WDM has been characterized according to numbers of channels or wavelengths supported and/or channel frequency size and/or spacing. These broad characterizations are commonly referred to as normal WDM, coarse WDM (CWDM) and dense WDM (DWDM). Normal WDM uses a limited number of wavelengths, e.g., two normal wavelengths 1310 and 1550 nm on a single optical fiber. CWDM allows for a greater number of channels, e.g., up to 18 channels, which may be transported over a single dark fiber at a channel or wavelength spacing of about 20 nm. DWDM may support more than 200 channels. According to some common configurations, DWDM supports up to 80, 100 GHz channels on a single fiber at 0.8 nm spacing. Alternatively, or in addition, DWDM may support 160, 50 GHz channels at on a single fiber at 0.4 nm spacing. By way of reference, ITU G694.1 defines the standard DWDM wavelength range as 1528.77 to 1563.86 nm. It is envisioned that the techniques disclosed herein are not limited by any particular channel arrangement or grid, be they fixed and/or flexible.

The example optical waveguide communication system 200 includes multiple lengths of optical fiber 204a-204f (generally 204), extending between physical locations. The physical locations may be referred to generally as nodes of the optical waveguide communication system 200, e.g., nodes 1-5 in the illustrative example. It is understood that optical communication links or channels may be established between one or more of the different nodes. By way of further example, an optical communication link includes an optical signal source at one end of an optical waveguide or fiber and adapted to generate, provide, direct and/or otherwise inject an optical signal into the optical fiber. For example, according to a DWDM application, the optical signal may include a modulated optical carrier wave operating at a center frequency and occupying a corresponding channel bandwidth as may be determined according to the example DWDM frequency grid. The optical waveguide, e.g., the optical fiber 204, includes a first end proximal to the optical signal source and a second distal end. The optical waveguide is configured to direct the optical signal from the proximal end to the distal end, which may be in optical communication with another, distal optical device. By way of non-limiting example, optical sources may include one or more of lasers, semiconductor lasers, laser diodes, or light emitting diodes.

The distal optical device may include, without limitation an optical detector adapted to detect information impressed upon the optical carrier by way of a modulation. The modulation may include, without limitation, analog modulation, digital modulation and/or a combination of analog and digital modulations. In at least some embodiments, one or more of an amplitude, a frequency or a phase of the optical carrier may be modulated. The optical detector may be adapted to detect the information according to coherent detection schemes, non-coherent detection schemes or combinations of both. In at least some embodiments, the optical detector convers a lightwave or optical signal into a corresponding electrical signal. By way of non-limiting example, optical detectors may include one or more of p-n photodiodes, pin photodiodes, or avalanche photodiodes.

In at least some embodiments, other components that may be included in an optical link include, without limitation, a mirror, a filter, a splitter, a combiner, a switch, an amplifier, e.g., an optical amplifier, such as an Erbium-doped optical fiber amplifier. Alternatively, or in addition, at least one end of an optical waveguide may be coupled to a multiplexer device, such as an optical add-drop multiplexer (OADM).

An OADM is a device used in WDM systems for multiplexing, demultiplexing and/or otherwise routing different channels of light into and/or out of an optical fiber. The OADM may receive one or more optical signals at OADM inputs representing separate WDM channels or wavelengths. In one aspect, the OADM may multiplex these inputs into a composite multiplexed signal that may be launched onto a single optical waveguide or fiber coupled to an OADM fiber port. Alternatively, or in addition, the OADM may receive at its fiber port, a multiplexed WDM signal from an optical fiber coupled to the fiber port. The OADM may operate to demultiplex one or more optical signals, generating separate OADM output signals representing demultiplexed versions of the separate WDM channels or wavelengths. A process of separating out one or more channels of a group of WDM channels conveyed by an optical waveguide may be referred to as a "drop" process, whereas a process of integrating one or more channels into a group of WDM channels conveyed by the optical waveguide may be referred to as an "add" process.

It is understood that in at least some embodiments, an OADM may arranged in a reconfigurable manner adapted to selectively add and/or drop one or more WDM channels of a WDM signal conveyed by an optical waveguide. Such reconfigurable arrangements may be referred to as reconfigurable OADM (ROADM) devices. It is also understood that ROADM devices may be described as having degrees corresponding to a number of interconnected optical waveguides adapted to guide WDM signals. A two-degree ROADM is coupled to two optical fibers, a three-degree ROADM is coupled to three fibers, and so on.

The example optical waveguide communication system 200 includes a first OADM 201a having a single fiber port P1 coupled to a first end of a first optical fiber 204a. The optical waveguide communication system 200 further includes a first, 2-degree ROADM 202a having a first port P1 in communication with a second end of the first optical fiber 204a and a second port P2 in communication with one end of a second optical fiber 204b. The second optical fiber 204b is in further communication with a first port P1 of a first 3-degree ROADM 203a. A third optical fiber 204c is coupled between a second port P2 of the first 3-degree ROADM 203a and a first port P1 if a second 2-degree ROADM 202b. A fourth optical fiber 204d is coupled between a second port P2 of the second 2-degree ROADM 202b and a second port P2 of a second 3-degree ROADM 203b. A fifth optical fiber 204e is coupled between a third port P3 of the second 3-degree ROADM 203b and a first port P1 if a third 2-degree ROADM 202c. Likewise, a sixth optical fiber 204f is coupled between a second port P2 of the third 2-degree ROADM 202c and a third port P3 of the first 3-degree ROADM 203a. According to the illustrative embodiment, the optical waveguide communication system 200 includes a seventh optical fiber 204g coupled between a first port P1 of the second 3-degree ROADM 203b and a first port P1 of the second OADM 201b. The third, fourth, fifth and sixth optical fibers 204c, 204d, 204c, 204f may be collectively referred to as forming a ring structure.

The first OADM 201a has three add-drop ports receiving, e.g., adding, a first input signal onto an R-channel from a first transponder 205a. The first OADM 201a adds a second input signal onto a Y-channel. The first OADM 201a combines, e.g., multiplexes, the two channels (R. Y) into a first WDM signal, which is applied to the first port P1 into the first optical fiber 204a. The first optical fiber 204a conveys the first WDM signal (R. Y) into the first port of the first, 2-degree ROADM 202a. The first, 2-degree ROADM 202a is coupled to a channel switch 207 configured to switch the R-channel to a B-channel. In this regard, the R-channel may be subject to an optical-to-electrical conversion at the R-channel wavelength to obtain an electrical signal that may be applied to an electrical-to-optical conversion to obtain the B-channel at the B-channel wavelength. Consequently, the first 2-degree ROADM 202a extracts the R-channel, switches and/or transfers the first signal from the R-channel onto the B-channel. The first, 2-degree ROADM 202a effectively passes the Y-channel, without requiring any electro-optical conversion of the Y-channel, combining the passed Y-channel with the newly generated B-channel. The result is a second WDM signal including the B and Y channels, injected into one end of the second optical fiber 204b.

The B and Y channels are input to the first port P1 of the first, 3-degree ROADM 203a, which passes the B and Y channels, combining them with a G' channel, and directing a combined WDM signal including the B, Y and G' channels onto the third optical fiber 204c. The third optical fiber 204c couples the B, Y, G' channels to the first port P1 of the second, 2-degree ROADM 202b. The second, 2-degree ROADM 202b, in turn, extracts or drops the B, Y and G' channels, e.g., directing the demultiplexed B. Y and G' channels to an optical transponder, detector or receiver 206c, which converts the B, Y and G' channels to electrical signals corresponding to information modulated on the respective optical channels.

According to the illustrative example, the second, 2-degree ROADM 202b also receives a G channel obtained from an electro-optical conversion of an electrical signal by a second transponder 205b. The second, 2-degree ROADM 202b provides a WDM signal including the added G channel, without the dropped B, Y and G' channels. The WDM signal is transported via a further optical fiber 204b to a second port of the second, 3-degree ROADM 203b. According to the example configuration, the second, 3-degree ROADM 203b does not send or receive any channels at the first port P1. Instead, the second, 3-degree ROADM 203b routes the G-channel to its third port P3, providing a WDM signal including only the G-channel. The WDM channel is routed via the fifth fiber 204c to a first port P1 of the third, 2-degree ROADM 202c, which drops the G-channel by demultiplexing the received WDM channel and coupling a G-channel to a transponder 206a configured to perform an optical-to-electrical conversion. A resulting electrical signal includes information modulated onto the G-channel.

The third, 2-degree ROADM 202c receives two new added channels, R' and G' from an electrical-to-optical converting device 205c and multiplexes the R' and G' channels onto a WDM signal. The WDM signal is transported to a third port P3 of the first, 3-degree ROADM 203a, which passes the G' channel to the second port P2, resulting in a WDM signal including the B, Y and G' signals at port P2. The first, 3-degree ROADM 203a drops the R'-channel, directing it to a transponder 206b, which performs an optical-to-electrical conversion to obtain an electrical signal that includes information modulated on the R'-channel.

It is understood that the optical fibers 204 may be of the same or similar design, e.g., providing a similar attenuation profile, numerical index, and so on. Alternatively, or in addition, one or more of the optical fibers 204 may differ from the others in at least one attribute. Collectively, the optical fibers 204, together with the OADMs 201a, 201b, generally 201, the 2-degree ROADMS 202a, 202b, generally 202 and the 3-degree ROADMs 203a, 203b, 203c, generally 203, are configured to transport information between one or more of the example nodes. Information may be added and/or extracted or dropped at any of the nodes as required. To that end, a configuration of the optical waveguide communication system 200 may be established and/or modified based on one or more communication requirements.

Communication requirements may include sources and/or destinations for information exchanges. In at least some embodiments, the communication requirements may include additional information, such as bandwidth requirements, latency requirements, tolerable error rate performance, and the like. In at least some embodiments, the communication requirements may be processed on demand, e.g., in a real time and/or near real time manner. Alternatively, or in addition, the communication requirements may be scheduled beforehand. It is envisioned further that future communication requirements may be estimated, anticipated, predicted and/or otherwise forecast.

The optical waveguide communication system 200 further includes a WDM controller 208. The WDM controller 208 may be configured to configure one or more adjustable network elements, nodes and/or components of the optical waveguide communication system 200 responsive to current and/or anticipated communication requirements. To that end, the WDM controller 208 may identify a number of individual optical waveguide links, each having a source end, A, and a destination end, Z, such that information may flow from A to Z. In at least some embodiments, the source and/or destination ends A, Z may be identified by the communication requirements. Thus, a first link, $L_1$ may be configured from a source end $A_1$ to a destination end $Z_1$. The first link may include a bandwidth requirement and/or any other attributes as may be included in the communication request.

The WDM controller 208 may be further configured to identify one or more optical waveguide paths between $A_1$ and $Z_1$ as may be available given a topology of the optical waveguide communication system 200. Without limitation, the topology may identify optical fibers 204, their lengths, types, attenuation profiles as may be affected by other optical waveguide elements, such as cable splices, couplers, amplifiers, filters and the like. The topology may further identify numbers, locations and types of OADMs 201 and/or ROADMs 202, 203. In at least some instances, details of the OADMs 201 and/or ROADMS 202, 203 may include available channels, available channel adjustments, utilized channels, which may include one or more reserved channels, and/or any other restrictions as may be beneficial to identifying optical waveguide paths between $A_1$ and $Z_1$.

The WDM controller 208 may be further configured to select and/or otherwise recommend a preferred optical waveguide path between $A_1$ and $Z_1$ from among any number of possible alternatives as may have been identified. Such selection may be based on one or more predetermined rules and/or policies. For example, one link may be preferred according to economical considerations, e.g., it may be the least expensive to provision and/or otherwise maintain. Alternatively, or in addition, a link may be preferred according to a reliability consideration, e.g., selecting one having a greater reliability, and/or a path length consideration, selecting one having a lesser path length, a channel bandwidth consideration, e.g., selecting one utilizing less bandwidth and/or having sufficient bandwidth, selecting one that minimizes frequency switching and/or limits frequency switching to a single band, e.g., within the C-band and/or L-band, and so on.

In at least some embodiments, the WDM controller 208 includes a software defined domain controller (SDDC) 208. The SDDC 208 may be in communication with one or more of the OADM 201, the ROADM 202, 203. In at least some embodiments, the SDDC 208 may be configured and/or configurable according to software defined networking (SDN) techniques. The SDDC 208 may be instantiated and/or configured by an orchestrator configured to orchestrate SDDC 208 and/or WDM functionality, e.g., responsive to one or more of changes in demand, capacity, network conditions, e.g., a broken fiber, network architecture, e.g., addition and/or expansion of optical fibers, and so on.

According to the illustrative example, the SDDC 208 may be in communication with one or more other systems. For example, the SDDC 208 may be in communication with a monitoring system 209 configured to monitor one or more of WDM operations, status of the optical waveguide communication system 200 and/or any subsystem or component thereof, utilization, e.g., numbers of links, WDM network topology, link topology, overall channel utilization, channel utilization, bandwidth utilization, optical signal attenuation, error rates, signal to noise ratios, link configuration, users, supported applications, and so on. The monitoring may be performed on a per link basis, a per optical fiber path segment basis, an overall system basis and/or any combination thereof.

Alternatively, or in addition, the SDDC 208 may be in communication with a storage system, such as a memory, a hard disk drive, an optical drive, a database system 210. The example database system 210 may be configured to store information related to one or more of an overall network topology, link topologies, optical waveguide path segments, equipment types, configurations and/or status. Alternatively, or in addition, the database system 210 may be configured to store communication requirements, associations between channel requirements, links configured to serve those requirements and/or link performance, e.g., bandwidth utilization, error rates, latency, interference, reliability, and so on. Such information may be tracked on current bases, e.g., what is the current system state and/or according to a historical record that includes prior monitored results.

In at least some embodiments, the SDDC 208 may be in communication with a machine learning and/or artificial intelligence system. For example, a machine learning system 211 may be configured to monitor communication requests, such as any requests as may have been made upon the example optical waveguide communication system 200. Alternatively, or in addition, the machine learning module 211 may develop and/or maintain a model as may be used to observe and/or otherwise predict performance of the optical waveguide communication system 200. Such predictions may include recommendations of WDM channels, channel wavelengths, channel bandwidths, link topologies and/or path segments, cross-frequency requirements as may be required based on an unavailability of a utilized WDM channel at one WDM network element, such as an OADM, a ROADM and/or an optical fiber.

A DWDM ROADM system, as may include a WDM controller, such as the example SDDC 208, may be defined by one or more characteristics, such as numbers of fiber ports, number of channel inputs and/or outputs, operational frequency range(s), insertion loss, supported modulation formats, e.g., flexible modulation formats, adaptive FEC, coherent MIMO receiver, flexible data rate, flexible data type, and the like. In operation, a DWDM ROADM system may be configured to tune to a target channel and/or group of channels, and/or to tune to a target bandwidth and/or range of bandwidths, and/or in at least some embodiments, to predict cross-frequency channel network pattern(s) and/or to intelligently recommend a cross frequency channel DWDM network path according to one or more policies and/or rules.

In at least some embodiments, the machine learning module 211 may operate in a manner that evaluates one or more aspects of the example optical waveguide communication system 200. For example, the machine learning module 211 may identify a WDM network topology and/or distinguish individual path segments, e.g., as may be distinguished by optical waveguide or fiber segments. Alternatively, or in addition, the machine learning module 211 may identify equipment types, e.g., OADM types, ROADM types, transponder types, optical fiber types, and so on. According to the identified equipment types the machine learning module 211 may evaluate an end-to-end link performance and/or an individual path segment performance for a give configuration of any supporting WDM equipment. To the extent any parameters of the WDM equipment may be varied, they are varied in a systematic manner, e.g., to examine all possible path segment and/or end-to-end links, under all possible conditions determined according to configurable parameters. It is envisioned that such evaluations may be accomplished experimentally, e.g., configuring the system and/or subsystems and obtaining measurements. Alternatively, or in addition, such evaluations may be accomplished computationally, e.g., based on known relationships related to system performance, such as attenuation, dispersion, noise, error rates, error correction, and so on.

Having evaluated the example optical waveguide communication system 200, the machine learning module 211 may develop an optical channel recommendation model that may be used to recommend configurations of one or more system elements. Such recommendations may include WDM link topology, and/or channel utilization, and/or cross-frequency requirement, and/or bandwidth requirement, and/or modulation technique, and so on.

It is understood that in at least some embodiments, the machine learning module 211 may develop a utilization and/or communication requirements model. Such a model may be based on historical observations, indicating communication requirements based on one or more of link sources, destinations, directions, bandwidth, time of day, day of week, location, users and so on. In at least some embodiments, the machine learning module 211 may obtain inputs from other sources, such as social and/or municipal events, e.g., sports games and/or conventions. Still other sources may include news and/or weather services and the like. The machine learning module 211 may develop, train and/or otherwise update a model configured to predict communication requirements. In at least some embodiments, such predictions may be provided to the optical channel recommendation model.

Alternatively, or in addition, the SDDC 208 may be in communication with other modules, such as a security module 212 as may be utilized to ensure all communication requests and/or recommendations comply with security and/or authorization requirements. Still other modules may include an operation and maintenance module (not shown) as may be used to monitor one or more of communication requirements, recommended WDM configurations, spare capacity and the like as may be beneficial for monitoring utilization over time. Such monitoring may be used as a source for recommending system maintenance requirements, maintenance schedules and/or future system modification and/or upgrades.

Figure 2B:
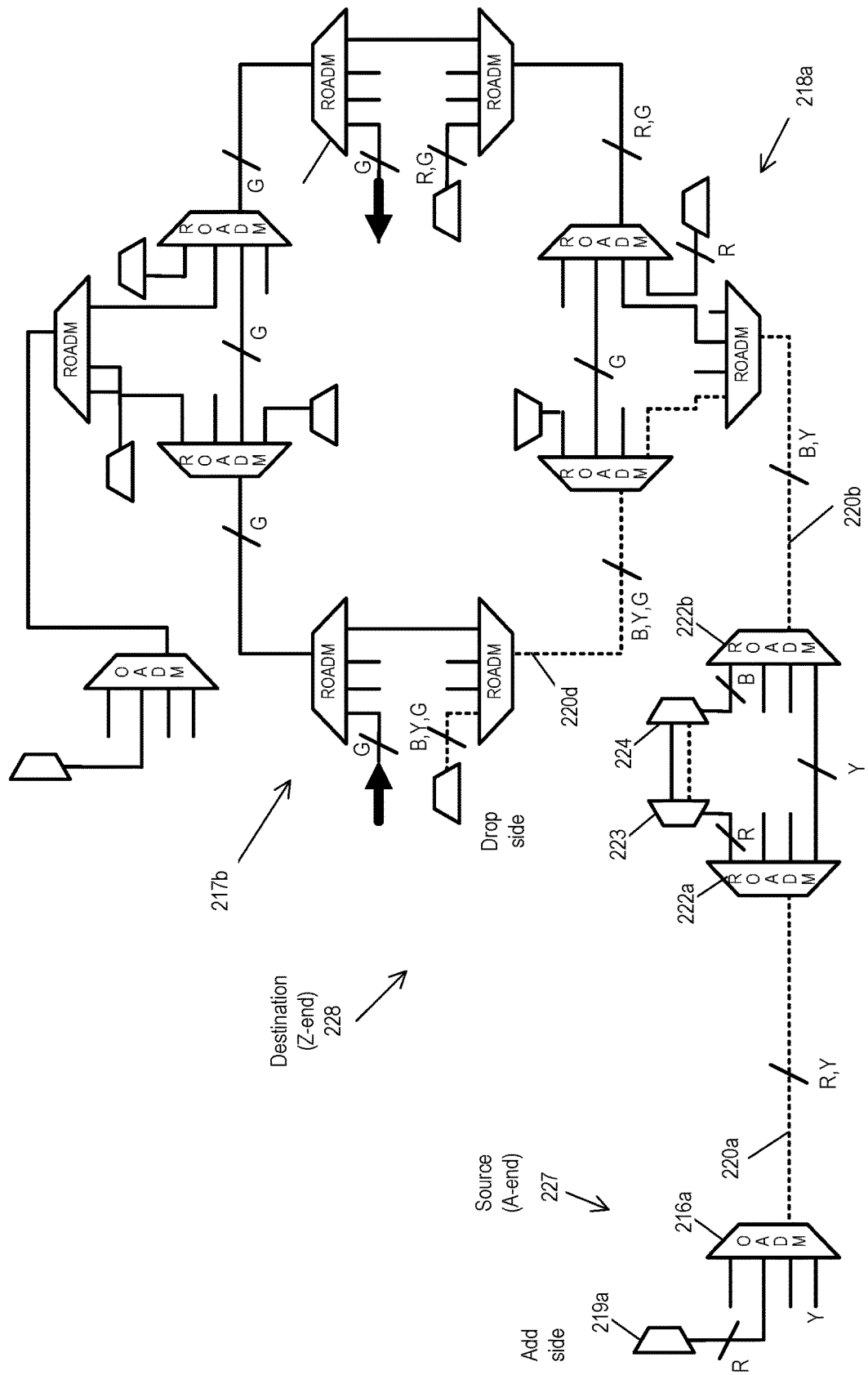
FIG. 2B is a more detailed block diagram illustrating an example, non-limiting embodiment of a portion of the optical waveguide communication system of FIG. 2A in accordance with various aspects described herein.

FIG. 2B is a more detailed block diagram illustrating an example, non-limiting embodiment of a WDM system 215 of the optical waveguide communication system of FIG. 2A in accordance with various aspects described herein. The WDM system 215 includes a first OADM 216a having multiple optical input/output terminals that are multiplexed onto a single optical waveguide 220a. One of the input/output terminals is in communication with an electrical-to-optical (E-O) converting device 219a. The E-O converting device 219a receives an electrical signal, generates an optical signal having a carrier wavelength R, an R-channel, modulated according to the received electrical signal. The R-channel is multiplexed together with a Y-channel and forwarded to a first ROADM 222a of a first, 2-degree ROADM 217a. The Y-channel is passed through to an input terminal of a second ROADM 222b of the first, 2-degree ROADM 217a, while the R-channel is passed to a switching system that includes an optical-to-electrical (O-E) converting device 223 configured to convert the R-channel to an electrical signal that preserves information provided on the R-channel. The electrical signal is passed to an E-O converting device 224 that generates a B-channel optical carrier, modulated according to the electrical signal. The second ROADM 222b of the first, 2-degree ROADM 217a combines the B-channel with the Y channel, multiplexing both to obtain a B-Y WDM channel that is provided onto a second optical waveguide 220b.

The B-Y WDM channel is passed to a first, 3-degree ROADM 218a, which passes the B-Y channel onto an input or a second ROADM 222b of the first, 3-degree ROADM 218a. The second ROADM 222b also receives a G-channel passed through from a third ROADM 222b of the first, 3-degree ROADM 218a. The second ROADM 222b combines, e.g., multiplexes, the B-Y channel and the G-channel to obtain a B-Y-G WDM channel that is provided onto a third optical waveguide 220d.

The B-Y-G WDM channel is passed to a second, 2-degree ROADM 217b, which passes the B-Y channel onto an O-E converting device 219a. O-E converting device 219a converts the B-Y-G channel to one or more electrical signals that preserve the information conveyed by the B-Y-G channel. In at least some embodiments, the O-E converting device 219a may include one or more transponders, a mux-ponder and/or a switch-ponder. According to the illustrative example, the R-channel is injected at a source or A-end 227. The channel is directed and/or otherwise routed to a destination or Z-end 228.

Figure 2C:
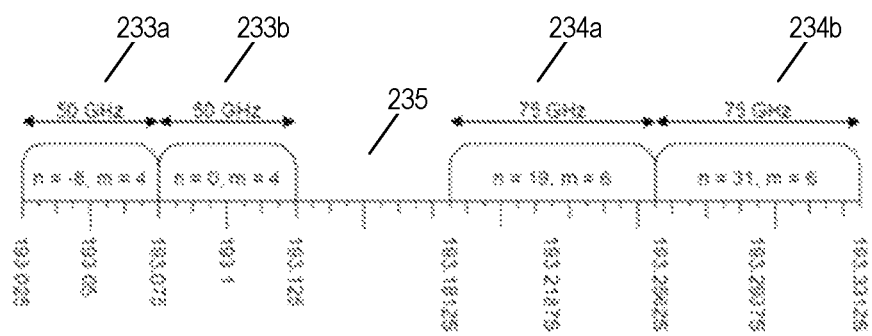
FIG. 2C is a schematic diagram illustrating an example, non-limiting embodiment of a portion of a WDM channel utilization within the communication network of FIG. 1 and the optical waveguide communication system of FIG. 2A in accordance with various aspects described herein.
Figure 2C:
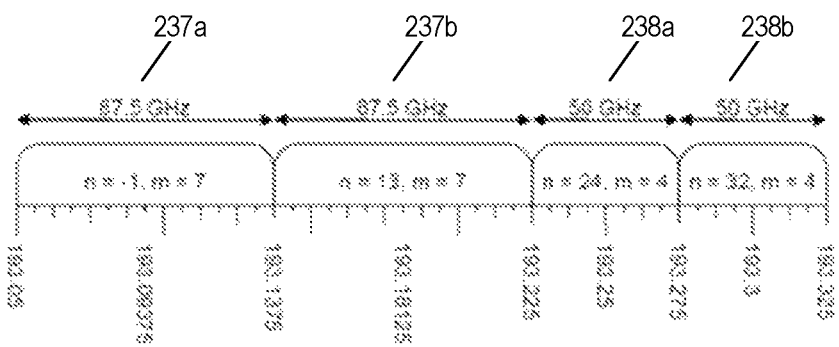

FIG. 2C is a schematic diagram illustrating an example, non-limiting embodiment of a portion of a WDM channel utilization within the communication network of FIG. 1 and the WDM system of FIG. 2A in accordance with various aspects described herein. A first spectral segment 232 extends from 193.025 THz to 193.33125 THz. Four channels 233a, 233b, 234a, 234b are illustrated within this portion of the spectrum according to a flexible DWDM grid strategy. According to the flexible DWDM grid strategy, allowed frequency slots have a nominal central frequency (in THz) defined by $193.1+n \times 0.00625$. The value n is an integer, which may be positive or negative, while 0.00625 represents a nominal central frequency granularity in THz. A slot width value, e.g., 12.5, represents a spectral slot width according to a granularity in GHz. According to at least one flexible DWDM grid strategy, any combination of frequency slots may be allowed as long as no two frequency slots overlap.

According to the illustrative example of the first spectral segment 232, the first channel 233a uses values of n=−8, m=4, such that the central frequency of the first channel 233a is 193.0500 THz, with a channel width of 50 GHz.

Likewise, the second channel 233b uses values of n=0, m=4, resulting in a central frequency of 293.1000 THz with a channel width of 50 GHz. Continuing with the illustrative example, the third channel 234a uses values of n=19, m=6, which results in a central frequency of 193.21875 THz with a channel width of 75 GHZ. Similarly, the fourth channel 234b uses values of n=31, m=6, resulting in a central frequency of 193.29375 THz with a channel width of 75 GHZ. The example channel allocation leaves an unused region 235 between the second and third channels 233b, 234a. The unused region 235 or hole, extends from 193.1250 THz to 193.18125 THz, having a width of about 56.25 GHZ.

According to another example, a second spectral segment 236 extends from 193.050 THz to 193.325 THz. Four channels 237a, 237b, 238a, 238b are illustrated within this portion of the spectrum according to a flexible DWDM grid strategy. According to the illustrative example of the second spectral segment 236, the first channel 237a uses values of n=−1, m=7, such that the central frequency of the first channel 237a is 193.09375 THz, with a channel width of 87.5 GHZ. Likewise, the second channel 237b uses values of n=13, m=7, resulting in a central frequency of 293.18125 THz with a channel width of 87.5 GHZ. Continuing with the illustrative example, the third channel 238a uses values of n=24, m=4, which results in a central frequency of 193.2500 THz with a channel width of 50 GHz. Similarly, the fourth channel 238b uses values of n=32, m=4, resulting in a central frequency of 193.3000 THz with a channel width of 50 GHz. The example channel allocation avoids any unused regions between the channels 236a, 236b, 238a. 238b, and for at least this reason, may be characterized as being spectrally efficient.

Figure 2D:
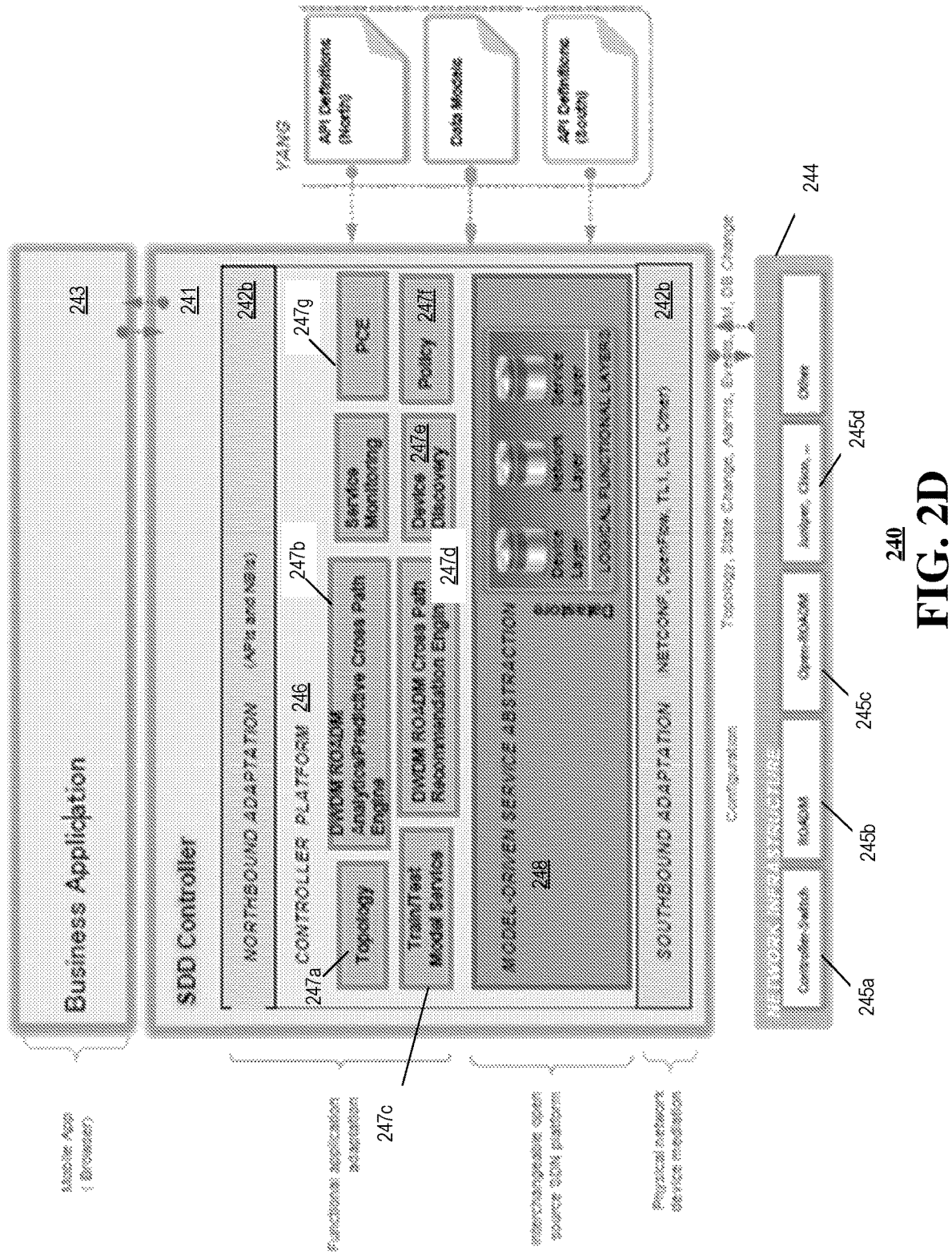
FIG. 2D is a block diagram illustrating an example, non-limiting embodiment of a domain controller functioning within the communication system 100 of FIG. 1 and the optical waveguide communication system systems of FIG. 2A in accordance with various aspects described herein.

FIG. 2D is a block diagram illustrating an example, non-limiting embodiment of a domain controller 240 functioning within the communication system 100 of FIG. 1 and the optical waveguide communication system 200 of FIG. 2A in accordance with various aspects described herein. When utilized in a software defined networking (SDN) environment, the domain controller 240 may include a software defined domain controller (SDDC) 241. The SDDC 241 may facilitate a learning of physical characteristics of one or more network domains and/or creation of a database, which may be analyzed by applications for predicting future needs of network resources. The database may facilitate a provision of information that supports decisions, recommendations and/or predictions of the SDDC regarding future demands, for example, determining whether a current network domain(s) configuration would be sufficient to accommodate any estimates of future network demand and/or utilization. In at least some embodiments, the SDDC collects parameters at run time, using the collected data to learn characteristics of one or more network domains. According to the illustrative examples, the network domains may include an optical fiber domain of an optical fiber telecommunications network, including one or more WDM systems. For example, the learning may support intelligence decisions regarding configurations of an overall WDM systems, a WDM system link, and/or configuration of a WDM system element and/or component, such as an optical add drop multiplexer (OADM), a reconfigurable OADM (ROADM), a transponder converting electrical signals to optical signals and vice versa. In at least some embodiments, the transponders may be incorporated into other elements, such as multiplexors, referred to as mux-ponders, and/or switches, referred to as switch-ponders.

For example, the optical fiber domain may include a WDM system as may be employed in a long-haul communication transport network, e.g., transnational, transcontinental and/or transoceanic. Alternatively, or in addition, the optical fiber domain may include a WDM system as may be employed in a medium-haul communication network, e.g., a metro area network, and/or a local area network. The SDDC 241 may observe, analyze, learn, configure and/or test configurations of one or more aspects of one or more WDM systems, including but not limited to, operation of individual components including, but not limited to, OADM, ROADM, transponder, mux-ponder and/or switch-ponder, and the like, and/or combinations of such elements as may form links and/or networks, thereby supporting smart and dynamic management of available optical fiber spectrum, such as the C and L bands, during run time.

In at least some embodiments, the SDDC 241 may include one or more of a topology manager 247a, and an artificial intelligence (AI) and/or machine learning (ML) subsystem. The SDDC 241 may be configured to train and/or test an AI and/or ML model to predict and/or otherwise recommend an intelligent and dynamic WDM network configuration, which may include one or more WDM links between two or more endpoints, e.g., operating in one or more C and/or L band channels. Configured optical fiber links of the WDM network may have one or more of flexible modulation formats, adaptive forward error correction (FEC), a flexible data rate, a flexible data type, flexible network endpoints, etc. In at least some embodiments, the WDM network may be configured to tune and/or otherwise select one or more of a light wave channel wavelength or frequency, a channel bandwidth, a channel spacing, and/or to otherwise optimize a network configuration and/or a network path. Optimization may be based on one or more parameters considered individually or in any combination, such as WDM link distance, number of WDM channels, number of WDM cross-frequency links, optical power, signal and/or path loss, dispersion, cross-talk, a reachability. A concept of reachability may be determined between two ends of an optical fiber and/or between two ends of an end-to-end optical fiber link, which may include more than one optical fibers and/or optical signals operating at one or more channels having respective nominal channel frequencies or wavelengths and/or channel bandwidths.

For example, the SDDC 241 may be implemented according to SDN principles, being instantiated on one or more configurable hardware platforms and configured to accomplish the intended functionality as disclosed herein. In at least some embodiments, the SDDC 241 may be configured to monitor, configure and/or otherwise control an WDM system of an optical fiber network. In this regard, the SDDC 241 may identify one or more of available WDM resources, a demand for WDM system resources, configurable parameters of the WDM resources. The SDDC 241 may be further configured to recommend and/or otherwise configure one or more WDM resources to accommodate the demand. Such configurations may include a planned WDM resource overhead. In at least some embodiments, the SDDC 241 may predict and/or otherwise forecast a fluctuating demand for WDM resources, recommending and/or initiating reconfigurations of WDM resources as may be necessary to accommodate changes in demand.

According to the illustrative example, the SDDC 241 is in communication with a network infrastructure 244, which may include elements of an optical fiber telecommunication network. In at least some embodiments, the network infrastructure 244 include elements of an optical waveguide communication system 200 as illustrated in FIGS. 2A and 2B. By way of example, and without limitation, the network infrastructure 244 may include one or more of an optical carrier switch controller 245a, an OADM, such as a ROADM node comprising a configuration of multiple ROADM devices 245b, an open ROADM, e.g., individual ROADM 245c, vendor specific devices 245d, and/or another optical fiber telecommunication network element and/or WDM system element, such as a transponder, a mux-ponder and/or a switch-ponder. In this regard, the SDDC 241 may include a first interface to the network infrastructure 244 and a second interface to one or more applications, e.g., to an example business application 243.

The example first interface may include a southbound adaptation 242a, providing an interface to the network infrastructure 244. The southbound adaptation 242a may include a physical interface and/or logical interface, e.g., between the SDDC 241 and one or more elements of the network infrastructure 244. A logical interface may be adapted according to one or more protocols, e.g., to facilitate communication and/or interoperation of the SDDC 241 and the network infrastructure 244. Alternatively, or in addition, the southbound adaption 242a may be configured according to a NETCONF protocol defined by the IETF to install, manipulate, and delete the configuration of network devices. Other examples include, without limitation the OpenFlow communications protocol adapted to provide access to a forwarding plane of a network switch or router over a network. Still other examples may include Transaction Language 1 (TL1) management protocol and/or a command-line interface (CLI), e.g., intended for human users who interact directly with one or more devices of the example network infrastructure 244.

The example second interface may include a northbound adaptation 242b, e.g., providing an interface to one or more applications 243. The northbound adaptation 242b may include a physical interface and/or logical interface between the SDDC 241 and one or more applications, e.g., a business application as may be employed by a network operator to operate network resources according to one or more rules and/or policies. The logical interface may also be adapted according to one or more protocols. Alternatively, or in addition, the northbound adaption 242b may include one or more application programming interfaces (APIs) configured to facilitate communications between the SDDC 241 and the application(s) 243.

In at least some embodiments, the SDDC 241 includes a controller platform 246. The controller platform 246 may include one or more of a topology module 247a, an WDM wireless channel analytics and/or WDM link prediction module 247b, a test/train service module 247c, a WDM link recommendation module 247d, a device discovery module 247e, a policy module 247f, a path computation element (PCE) module 247g, and/or a service monitoring module 247g. The device discovery module 247e may be adapted to discover a topology of an optical fiber telecommunication network, e.g., including a topology of a WDM system and/or or WDM system devices, such as OADMs, ROADMs, transponders, mux-ponders, switch-ponders and/or optical waveguides, e.g., fibers, that may be used in combination with the WDM systems.

The topology module 247a may identify one or more network elements, e.g., WDM systems and/or WDM system devices, as being capable of certain features, such as WDM links, WDM link endpoints, WDM link directions, WDM channels, channel size, channel spacing, channel availability. In such instances, the topology module 247a may identify at least one or more first available channels at one ROADM node, at least one or more second available channels at another ROADM node, at least one cross-frequency configuration adapted to form a WDM link from a first channel the first ROADM node operating at a first frequency and a second channel of the second ROADM node operating at a second frequency, different from the first. The topology module 247a may further identify a cross-frequency module at one of the first ROADM node, the second ROADM node, or at some intervening node along the optical link between the first and second ROADM nodes. In at least some embodiments, the topology module 247a may identify, recommend, and/or otherwise configure one or more elements of the WDM system. In particular, the topology module 247a may identify, recommend and/or otherwise recommend elements of an WDM system to configure a cross-frequency WDM link between two separate endpoints.

The WDM link recommendation module 247d may be configured to recommend one or more links. The links may include end-to-end links, e.g., from an A-end to a Z-end of a WDM network. Alternatively, or in addition, the links may be ordered, e.g., according to one or more criteria. The criteria may include, without limitation, efficiency, e.g., bandwidth efficiency, affordability, case of implementation, minimization of impact to other links, availability of cross path links. A cross path link may include an end-to-end WDM link that utilizes more than one channel frequency or wavelength. Sometimes referred to as cross-frequency links, an optical channel may be injected at a source end according to a first available channel assignment. The channel assignment may include a channel frequency, wavelength and/or bandwidth. According to a cross-frequency arrangement, the end-to-end link undergoes at least one frequency adjustment between the source and destination endpoints. The cross-frequency arrangement may be determined according to one or more criteria, such as optical channel availability, optical channel operational band, optical channel bandwidth, modulation, power, noise, etc.

The test and/or train service module 247c may be adapted to test one or more configurations of an WDM system as may be identified by the topology module 247a, predicted by the WDM link prediction module 247b and/or the WDM link recommendation module 247d. To the extent that the SDDC 241 is used in a machine learning application, the test and/or train service module 247c may be provide configuration and/or test results to a learning algorithm. The learning algorithm may be further adapted to configure and/or adapt a machine learning model, such that an application of a suitably trained model predicts results to within a desired accuracy. In at least some embodiments, the training may be accomplished based on a strategy that systematically configures and reconfigures an WDM system, testing the resulting WDM system and/or WDM link configurations and updating training data based on the results. Alternatively, or in addition, the training may be accomplished and/or otherwise updated or reinforced based on results obtained during normal system usage.

The policy module 247f may be configured to identify, store and/or enforce one or more policies. Such policies may be applied to any aspect of operation of the SDDC 241. For example, a policy may be employed in managing operation of the association of WDM system assets with a particular reserved portion of the network, and/or to ensure that special classes of users are provided access to the reserved portions, while others may be excluded.

In at least some embodiments, the logging module 247g may be configured to generate a record of and/or otherwise log one or more activities utilized and/or otherwise managed by the SDDC 241. For example, the PCE module 247g may generate a record identifying one or more discovered optical waveguide communication system assets, including WDM assets, parameters of the optical waveguide communication system assets, observations of operation of the optical waveguide communication system assets, measured and/or otherwise calculated, characteristics of a transport medium, such as a an optical fiber, a WDM channel, WDM system and/or ROADM configurations, test results, and so on. Such records may be utilized by one or more other modules of the SDDC 241, and/or the application(s). For example, the WDM channel analytics and/or prediction module 247b may access topology information including configurations, parameters, prior results, calculated predictions and the like as inputs for generating a prediction and/or recommendation. Alternatively, or in addition, the test and/or train service module 247c may access similar information in generating training data and/or testing a trained model for accuracy, e.g., comparing predicted WDM system, WDM link and/or WDM subsystem or device performance results to actual observed results.

In at least some embodiments, the WDM analytics and/or prediction module 247b may be configured to predict one or more characteristics of a WDM link and/or channel. Characteristics may include, without limitation, a fiber type, a fiber distance, a fiber attenuation or loss profile, a gain profile, an absorption loss, a scattering, a dispersion profile, and the like. Changing characteristics of a fiber optic channel of a WDM network may cause a hindrance in launching a new WDM channel, e.g., a new DWDM channel. Alternatively, or in addition, changing interface characteristics may impact existing channels. It is understood that an addition of more high-capacity channels may result in other changes, such as changes to a refractive index characteristic, e.g., due to nonlinearity, and/or polarization mode dispersion (PMD) as may be introduced by fiber twists. Still further changes may include changes to a noise characteristic, e.g., due to a requirement for more amplification. Other changes may include changes in amplified spontaneous emission (ASE) noise as may be experienced during greater amplification needs. It may be appreciated that adjustment of a network configuration, e.g., to accommodate a new and/or updated communication request, and/or changing in device, e.g., laser, characteristics over period of time, may result in unforeseen consequences to other channels supported by the same WDM system. The disclosed system and processes that utilize an intelligent WDM controller facilitate learning any and/or all of the above example parameters and optical characteristics. This learning. The SDDC 241 may facilitate a learning process to effectively learn one or more of the above parameters and/or air interface characteristics for an application, such as the example WDM system. In at least some embodiments, the intelligent WDM controller is configured to effectively learn topologies, performances and/or capabilities of a portion and/or an entire WDM network.

For example, a WDM controller may be configured to collect requirements and/or WDM parameters during a design time, e.g., while configuring a WDM system and/or a WDM link supported by the WDM system. Alternatively, or in addition, the WDM controller may be configured to collect such requirements during a run time as may be beneficial to identify changes as may result from component aging, nonlinearities, and/or faults. The WDM controller may be further configured to implement intelligent decisions in identifying, recommending and/or establishing an end-to-end WDM link, which may include a cross-frequency network pattern. In at least some embodiments, a cross-frequency network pattern utilizes more than one WDM channel along an end-to-end path. It is understood that generally any unnecessary optical-to-electrical and/or electrical-to-optical conversions may be undesirable in that they add to system complexity, cost and/or performance issues as may result from such conversions. Nevertheless, such cross-frequency conversions may be necessary to reach a particular network destination on available optical fibers. Without limitation, such unavailability of channels may result from channels being used by other links, equipment limitations, deficiencies and/or any channel separation requirements. In determining a network path solution, the WDM controller may identify multiple links. One link may be possible without a cross-frequency conversion, while another includes a conversion. Although cross-frequency conversions may be undesirable, their use may be traded off against other considerations, such as path length, latency, and so forth.

It is understood that the rules and/or policies may establish values, ranges and/or thresholds to facilitate tradeoff decisions. For example, tradeoffs may include utilizing a cross-frequency WDM path solution versus a non-cross-frequency path in view of any of the link parameters as may be considered independently or in combination. Parameters considered in any such tradeoff may include any of the example parameters disclosed herein and/or otherwise known to those familiar with WDM network planning and/or operation. For example, a path length above a certain threshold may introduce an undesirable and/or unacceptable amount of signal attenuation, distortion, and/or delay. Alternatively or in addition, different fibers may include different attenuation, dispersion and/or gain profiles, e.g., due to EDFAs. Such difference may result in a link that includes a cross-frequency WDM channel network path being preferable over a link with fewer or no cross-frequency WDM channel network paths.

In at least some embodiments, the WDM channel analytics and/or prediction module 247b may be configured to calculate a spectral efficiency based on a number of symbols M and dimensionality N. For example, the spectral efficiency (SE) may be calculated according to example equation 1.

$$SE = \mathrm{Log}_2(M) \div \left(\frac{N}{2}\right) \qquad \text{Eq. 1}$$

In at least some embodiments, the WDM channel analytics and/or prediction module 247b may be configured to calculate an asymptotic power efficiency, e.g., a Euclidian distance between symbol points ($d_{min}$) based on a number of symbols M, an average symbol rate $E_s$, as illustrated in Eq. 3, and an average energy per bit $E_b$, as illustrated in Eq. 4. For example, the asymptotic power efficiency (APE) may be calculated according to example equation 2.

$$APE = \gamma = \frac{d_{min}^2}{4E_b} = \frac{d_{min}^2 \log_2(M)}{4E_s} \qquad \text{Eq. 2}$$

$$E_s = \frac{1}{M} \sum_{k=1}^{M} \|C_k\|^2 \qquad \text{Eq. 3}$$

$$E_b = E_s / \log_2(M) \qquad \text{Eq. 4}$$

In at least some embodiments, the WDM channel analytics and/or prediction module 247b may be configured to calculate a signal attenuation, e.g., a signal attenuation per unit length in decibel, as illustrated in Eq. 5, in which L is an optical length, $P_i$ is a launch power and $P_o$ is a received power.

$$\alpha_{db} * L = 10 \log_{10}\left(\frac{P_i}{P_o}\right) \qquad \text{Eq. 5}$$

In at least some embodiments, the WDM channel analytics and/or prediction module 247b may be configured to calculate a stimulated Brillouin scattering (SBS) due to a modulation of light through thermal vibration within the optical fiber. Such scattering may appear as an upper and lower sideband, separated by the light carrier by the modulation frequency. A threshold power $P_B$ above which Brillouin scattering occurs may be calculated according to Eq. 6, in which d is a fiber core diameter in μm, λ is an operating wavelength in μm, $\alpha_{dB}$ is a fiber attenuation in dB/km and v is a source bandwidth in GHz.

$$P_B = 4.4 \times 10^{-3} d^2 \lambda^2 \alpha_{dB} v \text{ (watts)} \qquad \text{Eq. 6}$$

Alternatively, or in addition, the WDM channel analytics and/or prediction module 247b may be configured to calculate a stimulated Raman scattering (SRS), which is similar to SBS but occurs at a higher threshold power $P_R$. The SRS threshold power $P_R$ may be calculated according to Eq. 7.

$$P_R = 5.9 \times 10^{-2} d^2 \lambda^2 \alpha_{dB} v \text{ (watts)} \qquad \text{Eq. 7}$$

In at least some embodiments, computation of SBS and SRS threshold powers $P_B$, $P_R$ may be used to establish optical launch power levels that reduce and/or avoid these scatterings in the optical fiber.

In at least some embodiments, the WDM channel analytics and/or prediction module 247b may be configured to calculate a Rayleigh scattering coefficient $\Gamma_R$, e.g., according to Eq. 8, in which Λ is an optical wavelength, n is a refractive index of the medium, p is an average photo elastic coefficient, $\beta_c$ is the isothermal compressibility at a fictive temperature $T_F$, and K is Boltzmann's constant.

$$\Gamma_R = \frac{8\pi^3}{3\lambda^4} n^8 p 2 \beta_c K T_F \qquad \text{Eq. 8}$$

For optical fiber media having a constant refractive index and observing that the rest of the parameters are constant it is observed that the value $\Gamma_R$ depends upon wavelength of light. Accordingly, a value of $\Gamma_R$ may be calculated for each wavelength of a WDM system.

Alternatively, or in addition, the WDM channel analytics and/or prediction module 247b may be configured to calculate a material dispersion value M according to Eq. 9 and/or a root mean square (rms) pulse broadening Om over a length L according to Eq. 10.

$$M = \frac{\lambda}{c}\left|\frac{d^2 n}{c d \lambda^2}\right| \qquad \text{Eq. 9}$$

$$\sigma_m = \frac{\sigma_\lambda L}{c}\left|\lambda \frac{d^2 n}{c d \lambda^2}\right| = \sigma_\lambda L M \qquad \text{Eq. 10}$$

In at least some embodiments, the WDM channel analytics and/or prediction module 247b may be configured to calculate a first order group delay $\tau_g$ according to Eq. 11.

$$\tau_g = \frac{1}{c}\frac{d\beta}{d_k} \qquad \text{Eq. 11}$$

Alternatively, or in addition, predictions may be directed to demand and/or usage requirements. It is understood that demand may vary according to many factors. For example, demand may fluctuate according to daily and/or weekly traffic patterns. Consider an WDM system supporting WDM nodes at remote locations, such as distant cities, regions, nations and/or continents. As daily traffic patterns may include busy periods, e.g., rush hour, and quiet periods, it is understood that demand for utilization of the WDM system may vary accordingly, being greater during rush hour periods and lesser during intervening quite periods. Alternatively, or in addition, demand may vary according to events, which may include planned events, such as sporting events, holidays, conventions, and so on. In such instances, demand for utilization of the WDM system may surge during events. At least some events may be unplanned, such as weather events and/or other emergency events, such as fires, earthquakes, armed conflict, etc.

It is understood that fluctuations in demand may include one or more aspects, such as one or more of bandwidth requirements, latency requirements, variations in supported WDM applications. Any of the various analytics and/or machine learning techniques disclosed herein may be utilized to observe, monitor, evaluate and/or otherwise predict or forecast demand for utilization of the WDM system. Demand may be associated with one or more WDM system characteristics that may be adapted to accommodate the demand. By way of nonlimiting example, WDM system characteristics may include one or more of wireless frequency bands, bandwidths, modulation types, gain profiles, antenna configurations, receiver sensitivities. Accordingly, the WDM channel analytics and/or prediction module 247b may be configured to predict demand and/or one or more characteristics of a wireless channel in view of an actual demand, a scheduled demand and/or a predicted or forecasted demand.

In at least some embodiments, the SDDC 241 includes a model-drive service abstraction module 248. The service abstraction module 248 may be adapted to generate and/or otherwise facilitate access to physical and/or logical function layers of the WDM system. The example service abstraction model 248 includes a datastore having information related to logical functional layers that may include one or more of a device layer, a network layer and/or a service layer.

In at least some embodiments, the train and/or test service module 247c and/or the WDM channel prediction and/or recommendation engine 247b may operate alone and/or in combination to obtain a solution including a configuration of an WDM system and/or management of corresponding frequency spectrum and/or channels. In at least some embodiments, the solution may be divided into three parts. A first part includes a data generation step in which relevant data may be gathered and/or collected. In at least some embodiments, the first part may include one or more computations, such as the example computations provided herein, e.g., in one or more of Equations 1-11. According to a second part, a machine learning (ML) and/or artificial intelligence (AI) may be applied. In at least some embodiments the ML and/or AI may include generating, modifying and/or otherwise building a model. The model may receive input, e.g., parameters and/or requirements, determine a relationship between input and outputs and capture the relationship in a manner that may be applied to other input values. According to a third part, the model may be utilized to process one or more input values to produce an output, e.g., a recommendation, based on a ML and/or AI captured within the model.

At a high level, the topology module 247a may capture network view, which may be referred to as at least a part of a topology. Once a topology has been identified, a first route may be selected, e.g., from a source WDM node or network element to a destination WDM node or network element. The WDM node or network element, may have a set of selectable and/or otherwise configurable parameters. In such instances, a particular combination of parameters is selected and/or otherwise identified and applied to the first route. Once so configured, the link may be operated and/or otherwise modeled and/or simulated. Data may be collected and used alone or in combination with the configuration data to test and/or train.

Any and/or all computed, observed and/or otherwise measured resulting data may be collected and stored, e.g., at a database and/or a disk storage system. Systematically, a next set of parameters may be selected for the same route, which may be tested in a like manner, storing results as indicated. The process may be repeated in an exhaustive manner, until all parameters have been tested for the particular route. Routes may include, without limitation, optical links across a single fiber, e.g., between transceivers and/or other WDM components as may be employed the fiber end points. Alternatively, or in addition, the routes may include different optical channels, e.g., wavelengths, of a particular optical link, and/or directions of the link. The WDM network topology may be examined to determine whether any other routes may exist. To the extent they do, the above process may be repeated for each of the other routes, until all routes have been evaluated. In at least some embodiments, the above process may be repeated responsive to a change in topology and/or after a specific interval of time.

According to the ML and/or AI model building, as may utilize a deep learning (DL) algorithm, the data generated from a WDM system, WDM link, WDM subsystem or device and/or stored in a database, may be fed to a ML/DL engine. The database of gathered information may be used to perform analytics e.g., using continuously updated and/or otherwise learned network characteristics. Using learning from data sources, the SDDC 241 may learn further to take decisions on launching a new channel in the WDM network, e.g., a new or fresh WDM channel or wavelength. The ML/DL engine may identify and/or otherwise recommend a WDM channel or wavelength, selected and/or otherwise configured according to increasing a spectral efficiency, e.g., maximizing and/or otherwise optimizing the spectral efficiency. The automated approach facilitates prediction and/or forecasting of future trends in bandwidth requirements, allowing the WDM system to be adapted to account for variations, such as seasonal surge in network traffic, e.g., during Olympic games, cricket, football world cup events, and the like.

By conducting such a learning process over a learning period, the SDDC may be adapted to predict and forecast a future demand in usage of the WDM network and/or future growth needs. In at least some embodiments, the SDDC may be configured to determine and/or otherwise provide billing and/or costing information for an on-demand traffic setup, in which the SDDC may identify a suitable identify and/or otherwise recommend a WDM cross-frequency network path. For example, a reconfiguration may identify whether a single WDM channel is unavailable between a network link source and destination. If so, then then the WDM cross-frequency network path may be identified, e.g., by applying an algorithm to identify any and up to all possible WDM network, paths between the source and destination. A resulting group of possible network paths may be evaluated to determine a subset, and in at least some instances, a single preferred recommended WDM cross-frequency network path.

According to the usage of generated data for on-demand traffic prediction, recommendation and/or allocation of WDM channels, the SDDC 241 may provide a recommendation, based upon ML model results, for a best WDM path between a source and a destination of a WDM link, which may include a cross-frequency channel, e.g., utilizing more than one WDM channel in a serial arrangement along a path. Namely, one WDM channel may be used along a first segment of the WDM path, while a second WDM channel may be used along a second segment of the WDM path. It is envisioned that at least some cross-frequency WDM channels may include more than two different WDM channels, e.g., switching channels at multiple network nodes along the WDM path. During a launching of a new WDM channel, the SDDC 241 may automatically pick a number of channels and locations of those channels for a particular optical fiber and/or network segment between WDM network nodes. It is understood that different channels may have varying properties due to non-linearity and/or varying gain profiles. Practically, no two channels will have the same gain profile, distortion, dispersion, etc., and hence may have different reach. This would otherwise tend to complicate WDM system management, however, the techniques disclosed herein using the SDDC 241 is able to pick one or more WDM cross-frequency channels that are best suited for WDM management to ensure reachability between sources and destinations of each supported WDM link. In particular, the SDDC 241 may be able to pick channel locations, e.g., pairwise channel locations, and/or a number of channels required, based upon data collected from the WDM system.

Figure 2E:
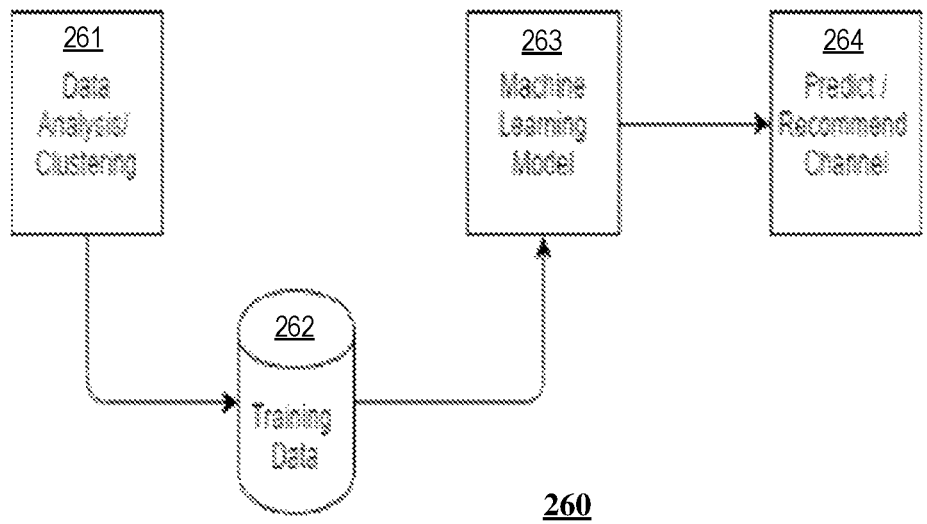
FIG. 2E is a block diagram illustrating an example, non-limiting embodiment of a machine learning system functioning within the communication network of FIG. 1 and the optical waveguide communication system of FIG. 2A in accordance with various aspects described herein.

FIG. 2E is a block diagram illustrating an example, non-limiting embodiment of a machine learning system 260 functioning within the communication system 100 of FIG. 1 and the WDM system of FIG. 2A in accordance with various aspects described herein. The example machine learning system 260 includes a data analysis module 261, a training data repository 262, a machine learning model 263 and a recommendation engine 264. The recommendation engine 264 may be adapted to provide a recommended configuration of one or more aspects of an access domain, e.g., a RAN, of a mobile communication system. The recommendation configurations may include, without limitation, a recommended configuration of a fronthaul and/or backhaul portion of the access domain. For a RAN domain adapted for operation according to WDM, the recommended configuration may include one or more configurable paths from a base transceiver station to an access terminal or node in fixed communication with a mobility core network.

The point of entry may be one of the base transceiver stations arranged according to a fixed path, such as a hardwired or cabled communication, with the core network. It is understood that cabled communication may include, without limitation, an optical fiber, a coaxial cable, copper twisted pair. Alternatively, or in addition, the fixed path may include a line-of-sight wireless link, as may employ microwave signals and/or optical signals. In at least some embodiments, the fixed path may include a satellite communications link. In contrast, the configurable paths may include wireless links or hops between one or more base transceiver stations and the point of entry, according to a direct path and/or a relay path through multiple base transceiver stations.

The data analysis module 261 may collect data from one or more elements of the access domain, which may include identification and/or configuration data from one or more base transceiver stations, data from network provisioning records that may provide equipment types, features, capabilities, locations, configurations, and so forth. Alternatively, or in addition, the data may be collected from operation of the access network. For example, the access network may be configured according to an evaluation test plan. Once configured, the network may be operated, allowing one or more aspects of the network to be monitored. In such instances, the collected data may include one or more of a configuration of the test plane and associated monitored data, e.g., transmit power gains, antenna configurations, received signal levels, error rates, SNR, Eb/No and the like. In at least some embodiments, the collected data may include ancillary information related to the test, such as time of day, day of week, season, environmental conditions, interference, and so on.

The data analysis may include, without limitation, summarizing results, e.g., whether a tested path supported operation according to a predetermined success criterion, was it reachable. Alternatively, or in addition, the data analysis may include discovery of patterns, organization of the collected data, clustering, and the like, representing data analysis results. The data analysis module 261 may provide one or more elements of the collected and/or the analysis results to a training data repository 262. The training data repository 262, in turn, may store and/or otherwise retain the collected data and/or data analysis results in a retrievable manner. For example, the training data repository 262 may include a matrix of test results and/or a collection of similar matrices according to WDM paths, equipment configurations, and the like. Alternatively, or in addition, the training data repository 262 may store the data in a database system.

The machine learning module 263 may employ one or more machine learning techniques. The machine learning technique(s) may utilize content of the training data repository 262 as training data. For example, certain stored records may identify a network configuration and a result that may include received signal levels, error rates, and/or summary results as to whether a particular node and/or path was reachable. The machine learning module 263 may be adapted to identify an input portion of the stored record, e.g., a system configuration and an output portion, e.g., a result of operating the system according to the particular configuration. The machine learning module 263 may formulate a predicted result based on the configuration. According to a training process, the predicted result may be compared to an actual result contained within the training record. The machine learning model 263 may be adapted based on a result of such comparisons. For example, an agreement of the predicted and actual results may represent positive feedback that the model is functioning properly, whereas a disagreement may represent negative feedback. In at least some embodiments, a difference between the predicted result and the actual result may be calculated and interpreted as an error value. It is understood that one or more adjustable features of the machine learning model 263 may be adapted based on the error value. In at least some embodiments, a training process may continue until a success criterion and/or error criterion is observed below a respective threshold.

In at least some embodiments, the data analysis module 261 may collect and/or analyze data of opportunity as may be gathered during routine operation of the access network. Data collected in such a manner may be utilized in an ongoing training process, e.g., allowing the machine learning model 263 to formulate a prediction based on the routine data collection and comparing predicted results to observed actual results.

Although the above examples describe data collection and model training in a context of configurating and operating an access network, it is understood that system may be applied to other data. For example, the data analysis module 261 may collect data relating to usage of the access network. Usage may include, without limitation, numbers of users supported, frequencies, frequency bands and/or channels utilized for communications with UEs and/or for WDM links, bandwidths, utilization, supported applications, user categories, e.g., average consumers, prioritized users, private network usage as may be supported by the access network. In at least some embodiments, the usage results may be stored along with ancillary information, such as time of day, day of week, physical location, events, including scheduled events, such as sporting events, conferences, and/or unscheduled events, such as storms, wildfires, and/or other civil emergencies.

The data analysis module 261 may analyze the collected data to obtain analysis results. For example, the analysis results may correlate usage patterns with ancillary information, types of users, applications, and the like. The analysis results may be stored, e.g., in the training data repository 262 and used to train a machine learning model, such as the example machine learning model 263. It is understood that in at least some embodiments, the machine learning module 263 may be the same one described above in relation to access network configuration and operation. Accordingly, the machine learning module 263 may be trained according to combinations of access network configuration and performance data as well as utilization and other ancillary information. Training may include using prescribed and/or scripted training data. Alternatively, or in addition, training may include using routine operational data to adapt, enhance and/or otherwise adjust the machine learning training model 265.

Figure 2F:
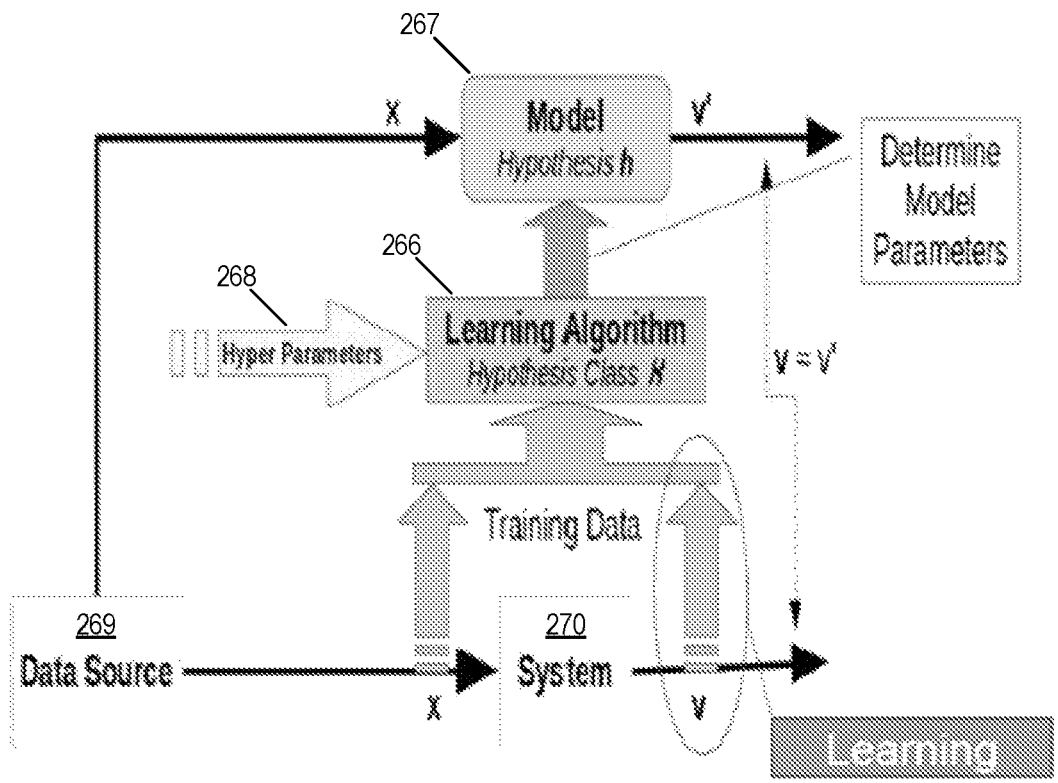
FIG. 2F is a block diagram illustrating another example, non-limiting embodiment of a machine learning system functioning within the communication network of FIG. 1 and the optical waveguide communication system of FIG. 2A in accordance with various aspects described herein.

FIG. 2F is a block diagram illustrating another example, non-limiting embodiment of a machine learning system 265 functioning within the communication system 100 of FIG. 1 and the optical waveguide communication system 200 of FIG. 2A in accordance with various aspects described herein. The example machine learning system 265 includes a learning algorithm 266 and a model 267. The model 267 may be initialized, modified, adapted and/or otherwise trained according to the learning algorithm 266. The model 267 receives input data from a data source 269, represented by "x," and generates a predicted output, represented by "v'." In at least some instances the data source 269 provides the same input data "x" to an actual system 270, to obtain an actual output "v." A set of training data may be generated according to a pairing of the actual input and output of the system 270, x and v. The training data may be processed by the learning algorithm 266 to obtain learned relationships between the actual and training data. In at least some embodiments, the model 267, may be adapted according to the learned relationships to apply a hypothesis to subsequent input data.

In at least some embodiments, a training process trains the model 267 according to an application of the learning algorithm 266, as may have been derived and/or otherwise configured from the training data. A trained model 267 may receive subsequent data from the data source 269 and provide a predicted output v' according to hypotheses of the trained model 267. In at least some instances, the same data from the data source 269 may be applied to the physical system 270 to obtain an actual output v. The actual output v may be compared to the predicted output v' to determine an error. To the extent the predicted and actual outputs agree the model 267 is suitably trained. However, to the extent the predicted and actual output disagree, the model 267 may require further training. In at least some embodiments, a tolerable error rate may be established as a threshold value, such that errors below the threshold may initiate further training, whereas errors above the threshold may not. Example error thresholds may be established according to an application, a particular access network, a network operator criterion, a customer criterion and so on. For example, an error threshold may be set at a percentage value, e.g., 80% or 90% success vs. 20% or 10% errors, such that a training process may be continued and/or otherwise initiated until the errors fall below the threshold.

It is understood that in at least some embodiments, the learning algorithm 266 may be adjustable via one or more hyper parameters 268. The hyper parameters 268 may be provide and/or otherwise modified responsive to an observed error rate. It is understood further that the training process may be performed once, e.g., during a system configuration period, periodically, e.g., responsive to an event, such as a system failure and/or reconfiguration, according to a schedule, e.g., periodically, such as hourly, daily, weekly, and so on. In at least some embodiments, the performance operation and/or training process may be performed in a substantially continuous manner, such that predictions provided by the model 267, may be implemented within the system 270 to obtain actual results that may be compared with predicted results as described above.

Figure 2G:
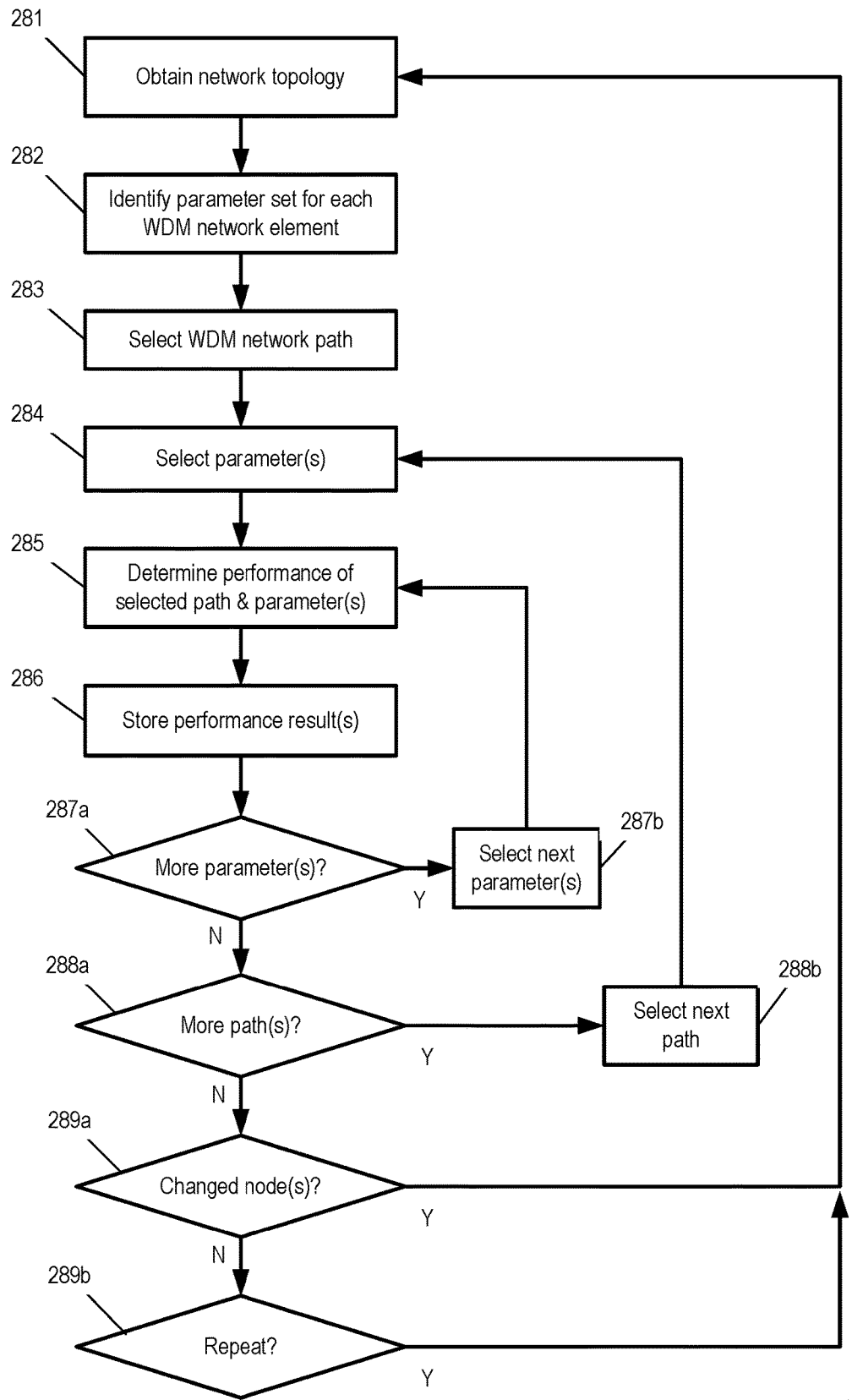
FIG. 2G depicts an illustrative embodiment of an example process for managing an WDM system functioning within the communication network of FIG. 1 and the optical waveguide communication system systems of FIG. 2A in accordance with various aspects described herein.

FIG. 2G depicts an illustrative embodiment of an example process 280 for managing a WDM system functioning within the communication system 100 of FIG. 1 and the optical waveguide communication system 200 of FIG. 2A in accordance with various aspects described herein. A topology of the optical fiber communication network may be obtained at 281. The topology may include, without limitation, identities and/or other suitable references of fiber optic network elements, such as WDM nodes, OADMs, ROADMs, transponders, mux-ponders, switch-ponders. For example, WDM node identifiers may include any identifiable reference as may be used by a system operator to manage and/or otherwise track network assets. Alternatively, or in addition, the topology may include characteristics of one or more of the WDM nodes, OADMs, ROADMs, transponders, mux-ponders, switch-ponders, optical fibers and any other network element that may be employed in a WDM network application. Fiber optic network element characteristics may include, without limitation, one or more wavelengths, optical power levels, bandwidths, data rates, modulation types, optical fiber specifications, channel assignments, a technology, a protocol, and/or other distinguishable technical trait. For example, a WDM node characteristic may associate an identified device with a type of WDM node, e.g., a DWDM node, a minimum channel spacing. It is understood that in at least some embodiments, a network topology of a WDM transport domain may include physical locations of the WDM nodes, OADMs, ROADMs, transponders, mux-ponders, switch-ponders, and/or logical network locations.

A parameter set may be identified at 282 for each WDM node (FIG. 2A). by way of example, the parameter set may include a ROADM degree, e.g., how many fibers it couples to, a number of wavelengths supported, insertion loss, minimum channel spacing, whether the WDM node supports a cross frequency channel, and/or identification of any interconnected transponders, mux-ponders, switch-ponders. To the extent the WDM node is configured for cross frequency channels, the WDM node parameter set may include a number and/or range of supported cross-frequency channels, a switching latency, electro-optical conversion loss and/or gain. In at least some embodiments, the parameter set may include parameters of other components, such as the transponders, mux-ponders, switch-ponders. Such parameters may include, without limitation, number of mux channels, power levels, wavelengths, and so on. In general, any of the parameters may include capabilities of the equipment and/or equipment configuration. Alternatively, or in addition, the parameters may include policy limitations as may be imposed, e.g., by a network service provider. In at least some embodiments, the parameters may include selected and/or configured values, e.g., as may have been established during a fiber optic network configuration process including operational scenarios and/or test scenarios.

According to the example process 280, a WDM network configuration, e.g., a network path and/or a cross frequency channel DWDM network path may be selected at 283. In some embodiments, the network configuration may be selected according to pairwise combinations of the individual network elements, e.g., selected pairs of WDM nodes. It is understood that WDM network configurations may include a single transponder, mux-ponder, switch-ponder of an add side, or A-end in optical communication with a first OADM, which is in further communication with a second OADM via a fiber optic cable. To the extent pairs of OADMs are considered, they may be evaluated and/or otherwise observed independently.

For each selected path, one or more of the aforementioned parameters, e.g., characteristics of the WDM nodes, optical fibers, transponders, mux-ponders, switch-ponders, may be selected at 284. For example, an operational wavelength or channel center frequency and/or bandwidth may be selected, along with a transmit power level, a receiver sensitivity, gain and/or attenuation of any other components along the path, e.g., including contributions from an optical fiber, any fiber amplifiers, splices, connectors, switches, signal splitters and/or combiners, and so on. In at least some embodiments, parameters may include link parameters, such as absorption losses as may be estimated and/or otherwise observed. It is understood that absorption losses may vary according to cable conditions, e.g., age, temperature, bends and/or any other parameters may include variations in absorption losses.

A performance of the selected path may be evaluated, estimated, observed and/or otherwise determined at 285, e.g., according to the selected parameter(s). It is understood that the performance may be characterized according to one or more performance metrics determined according to one of a calculation, a measurement, or a combination of a calculation and a measurement. In at least some embodiments, a calculation may be based on one or more of a distance between the path endpoints, a gain profile, absorption losses along the path, scattering, e.g., Rayleigh scattering, Mie scattering, and the like, a dispersion profile, and the like. In at least some examples, the performance metric(s) may be determined according to a link budget calculation. For example, a link budget calculation may determine a link performance metric, such as a received signal level, a signal-to-noise ratio (SNR), a signal-plus-interference-to-noise ratio (SINR), an energy-per-bit to noise power spectral density ratio (Eb/No), and the like.

Performance based on measurements may include configuring one or more endpoints of a selected path according to the selected parameters. Once configured, the path may be operated in one direction, e.g., from an A-end to a Z-end, from the Z-end to the A-end, or in both directions. In at least some embodiments, the measurements may be based on actual signals and/or packets and/or test signals and/or packets sent in one or both directions along the selected path. Measurement based performance metrics may include any metric suitable for evaluating a performance of the path, such as any one or more of the aforementioned, calculated performance metrics.

It is understood that performance metrics may include technical values, such numerical values of transmit signal power, received signal levels, SNR, SINR, Eb/No and the like. Alternatively, or in addition, the performance metrics include a summary result, e.g., whether the selected path is "reachable" according to the WDM in view of the selected parameters. Reachability may include, without limitation, that a particular path, given node positions, optical fiber characteristics and/or lengths and/or values of any other selectable parameters, yields a performance metric deemed suitable for operation. It is understood that in at least some embodiments, suitability may be based on one or more of an application type, a data rate, Eb/n0, a data type and/or application type, a subscription level, and/or other operator policies.

In at least some embodiments the resulting performance metrics may be stored at 286. Storage may be performed in a retrievable manner, such that an operator and/or an WDM controller, may access the stored results to identify and/or otherwise select a preferred configuration of an WDM network. In at least some embodiments, the performance metrics may be stored in a database that may be accessible to the operator and/or an WDM controller. The stored results may include one or more of the identities of the path segment nodes or endpoints, configuration parameters, detailed technical performance metrics, summary performance metrics, and the like. In at least some embodiments, the stored results may include other information as may relate to a time and/or date at which the results were obtained, a number of times the results may have changed, e.g., according to subsequent evaluations, a trend in performance, and so on.

In at least some embodiments, the process 280 is conducted in an exhaustive manner to consider all possible paths, operating under all possible configurations, e.g., according to the selected parameters. A scope of the network elements for consideration may be determined, e.g., according to an operational area, e.g., a coverage area of a particular fiber optic network, a geographic location, a cable distance from some reference, such as an A-end OADM node, and so on. Accordingly, the example process 280 may determine at 287a, whether there are any untested parameters. To the extent it is determined at 287a that there are more untested parameters, select a next parameter at 287b, and continue with the process 280 from step 285. Otherwise proceed to determine if there are more untested paths at 288a. To the extent it is determined at 288a that there are more untested paths, select a next path at 288b, and continue with the process 280 from step 284.

It is anticipated that the performance results may be subject to change for one or more reasons, such as different times of day, different days of the week, different seasons, equipment variations, aging, failures, and/or any other changes to RAN configuration. Understanding such possibilities, the process 280, in at least some embodiments, may include one or more provisions to repeat at least a portion of the calculations, storing any updated performance results. For example, a determination may be made at 289a as to whether a configuration of network nodes has changed, e.g., by adding one or more new nodes, by removing one or more previously considered nodes, and/or by otherwise modifying one or more of the previously considered nodes. Node modifications may include, without limitation, changes to one or more of the parameters, e.g., as may result from an antenna upgrade, a radio upgrade, and the like. Detection of changes to the nodes may be recognized by a presence, absence, and or content of status messages as may be provided by the nodes, e.g., during normal operation of the WDM network and/or the OADM nodes. Alternatively, or in addition, changes may be recognized from an inspection of WDM network provisioning records, WDM network operation and maintenance records and/or input from network planners and/or network operators. To the extent it is determined at 289a that a configuration of the network nodes has changed, at least a portion of the process 280 may repeated, e.g., continuing from step 281.

In at least some embodiments, the example process 280 may be repeated. In this regard, a determination may be made at 289b whether the process should be repeated. To the extent it is determined at 289b that the process should be repeated, the process may repeat, e.g., continuing from step 281. For example, in some embodiments, the process 280 may be repeated periodically, e.g., once or more a day, once or more a week, once a month, season, year, etc. Such repetitions may occur according to a predetermined schedule, e.g., an operation and/or maintenance schedule. Alternatively, or in addition, the process 280 may be repeated responsive to an event, such as a maintenance event, e.g., an error, an observed change in usage characteristics. In at least some embodiments, the process 280 may repeated on demand, e.g., as may be requested by an operator.

Figure 2H:
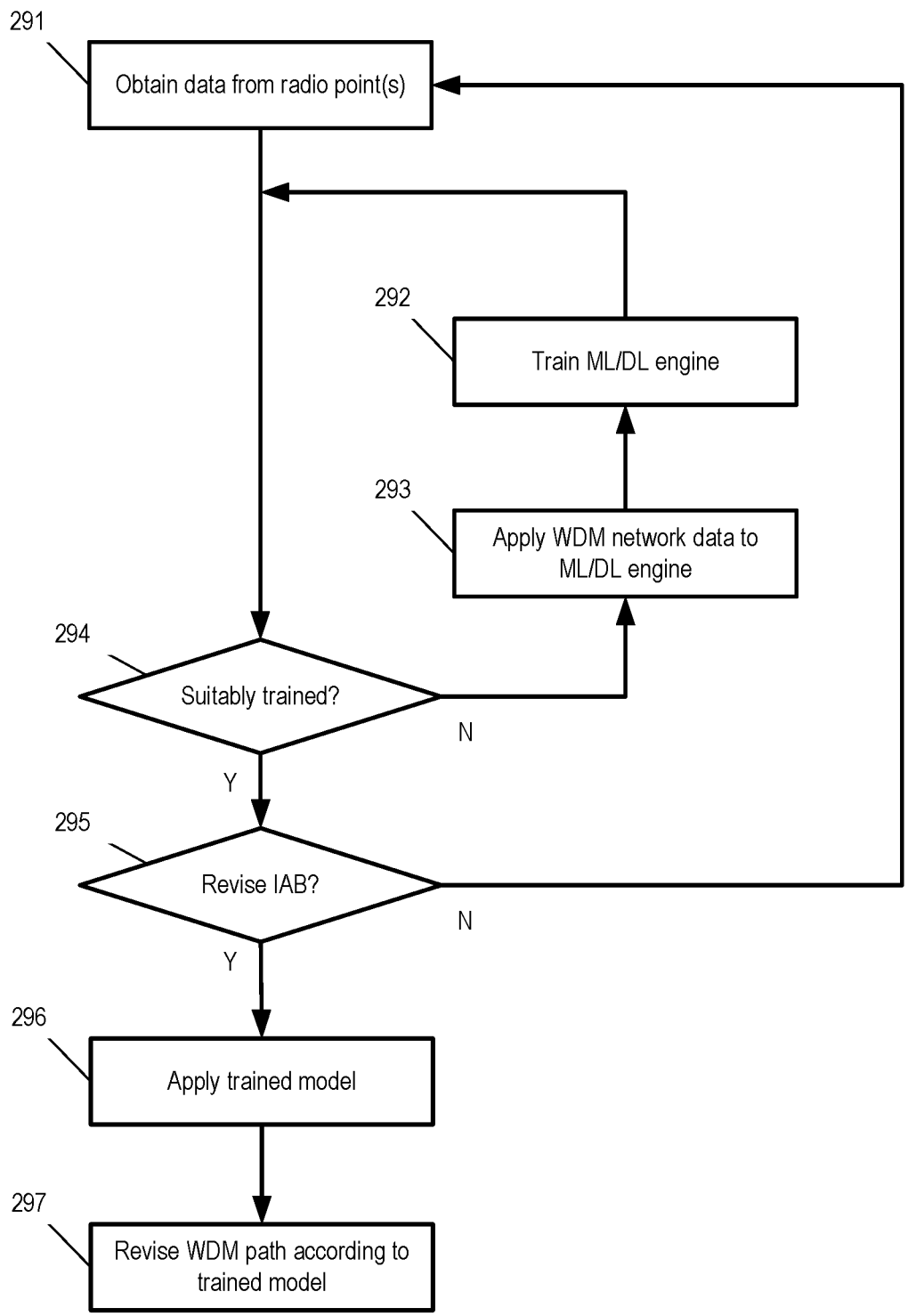
FIG. 2H depicts an illustrative embodiment of another example process for managing an WDM system functioning within the communication network of FIG. 1 and the optical waveguide communication system systems of FIG. 2A in accordance with various aspects described herein.

FIG. 2H depicts an illustrative embodiment of another example WDM management process 290 for managing an WDM system functioning within the communication system 100 of FIG. 1 and the WDM system of FIG. 2A in accordance with various aspects described herein. According to the WDM management process 290, data is obtained from network elements at 291. Data may include any of the various parameters disclosed herein, such as identifying data, e.g., a reference name, a network address, a physical location, e.g., geocoordinates, a software version, an operational parameter, such as an optical fiber type, an OADM node type, a transponder, mux-ponder, switch-ponder type, available modulation techniques, transmit power levels, operational channels, wavelengths and/or frequency band(s) and/or bandwidth, receiver sensitivity, noise floor, noise figure, operational protocol(s) and the like.

In at least some embodiments, the WDM management process 290 incorporates machine learning, which may include training a model, e.g., to recommend a WDM network configuration based on an actual and/or anticipated network demand. To the extent that the WDM management process 290 utilizes a machine learning model, a determination may be made at 294 as to whether the model is suitably trained. To the extent it is determined that the machine learning model is not suitably trained, the process 290 may apply WDM network data to a machine learning engine at 293. The machine learning engine may, in turn, train the machine learning engine at 292. After training, the process may return to determine whether the machine learning model is suitably trained at 294. To the extent it is not, the training loop may be repeated until it is determined at 294 that the machine learning model has been suitably trained. Training may include any of the various examples disclosed herein and/or otherwise known to those skilled in the art of machine learning.

Continuing with the example WDM management process 290, a determination may be made at 295 as to whether a configuration of the WDM network, which may include a configuration of one or more OADMs, transponders, muxponders and/or switch-ponders, should be revised. To the extent it is determined that the WDM configuration does not need to be revised, the WDM management process 290 may repeat from step 291, e.g., obtaining subsequent data from the WDM network at 291, evaluating the trained model, revising the model as may be necessary and reapplying the model. To the extent it is determined that the WDM does need to be revised, the WDM management process 290 may apply the trained model at 296. The process 290 may next proceed to revise the WDM network path, e.g., across frequency channel DWDM network path, according to the trained model 297.

The disclosed techniques include systems, devices, processes and/or software to facilitate adaptability and flexibility of a backhaul network that utilizes wireless backhaul segments for on demand traffic needs. Such needs may result from sudden surges on network traffic and configure the backhaul network strategically to manage peak hour traffic needs. Beneficially, the disclosed techniques permit a current backhaul network to learn from past experiences, e.g., to anticipate surges in extra bandwidth needs due to specific occasions. In at least some situations, a particular path of an WDM network may require dedicated bandwidth for a particularly large event, such as a world cup match and/or Olympic games. Bandwidth demand for traffic may also increase high during festival seasons, such as New Year, Christmas, Diwali etc.

The example processes apply a novel approach for optical fiber WDM spectrum allocation, e.g., utilizing an intelligent WDM controller configured to identify, analyze, evaluate and/or recommend cross frequency channel DWDM network patterns. In at least some embodiments, the example systems, devices and/or processes resolve a recognized problem of creating holes for freshly launched cross-channels within the available WDM spectrum. The application of machine learning and/or artificial intelligence, e.g., deep learning (DL) to develop a model that, among other things, may implement an algorithm to defragment spectrum, e.g., with little or no impact to the existing traffic. For example, the algorithm may utilize WDM controller knowledge to compute an impact for each possible movement of a WDM channel, e.g., also providing options to take action immediately, or at some later time, such as during a planned maintenance window. Should an operator choose to use a future time, e.g., during a maintenance window, to take that action, then the WDM controller may be configured to initiate the channel initialization and/or change action automatically during that future time and/or maintenance window.

To the extent the WDM controller identifies a possible impact, e.g., an impact to another user and/or WDM channel or link, the WDM controller may estimate the impact, e.g., by calculating a measure of the impact for the movement, e.g., in terms of performance, cost, delay, and the like. In at least some embodiments, the WDM controller may notify a WDM network operator, e.g., during a DWDM evaluation and/or prediction phase. In at least some embodiments, a network operator may be presented with one or more options, e.g., to accept the impact. If accepted, then then WDM controller may initiate a corresponding action plan, such as a move of one or more cross channels to create a spectral hole or gap, and a launching of a new cross channel into the newly created hole or gap. Alternatively, to the extent the network operator does not accept the impact, the WDM controller may be configured to provide one or more other options, e.g., for a next coming maintenance window. In such instances, the network operator may be asked to either choose automatic switch or manual. If an automatic switch over is selected, then the WDM controller may be configured to initiate the switch over during the next available maintenance window automatically else operator will trigger it manually.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
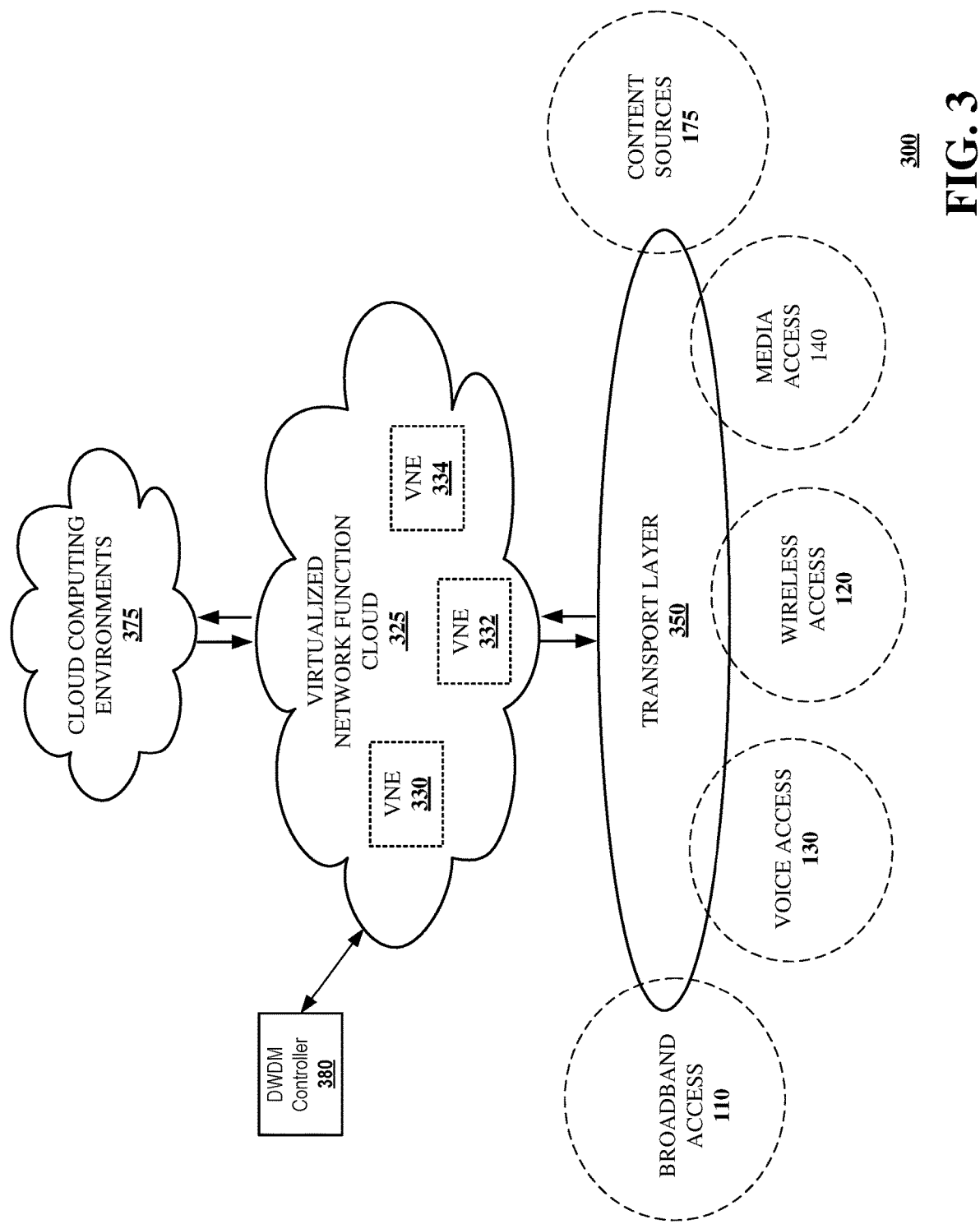
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of the communication system 100, the subsystems and functions of systems 200, 215, 240, 260, 265 and processes 280, 290 presented in FIGS. 1, 2A, 2B, 2C, 2D, 2E, 2F, 2G, 2H, 2I, 2J and 3. For example, virtualized communication network 300 can facilitate in whole or in part discovering a network topology of a WDM network having reconfigurable optical add-drop multiplexor nodes (ROADMs) configured for operation in fiberoptic communications network, identifying operational parameters of OADM nodes, and applying a machine learning approach to train a model based on observations of WDM network performance in view of the discovered topology and operational parameters. The trained model may be used to identify and/or otherwise recommend a WDM cross-frequency network path. A configuration of the WDM, including operating channels and/or bandwidth may be determined according to the trained model to address a communication requirement.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

According to the illustrative example, the wireless access 120 may be adapted to include an access domain controller 380. The access domain controller 380 may include an WDM system controller that may include an SDDC configured according to one or more of the various techniques herein to gather information, to train a machine learning model and to apply a trained model to provide recommendations for WDM system operation and/or identification for WDM system growth requirements.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
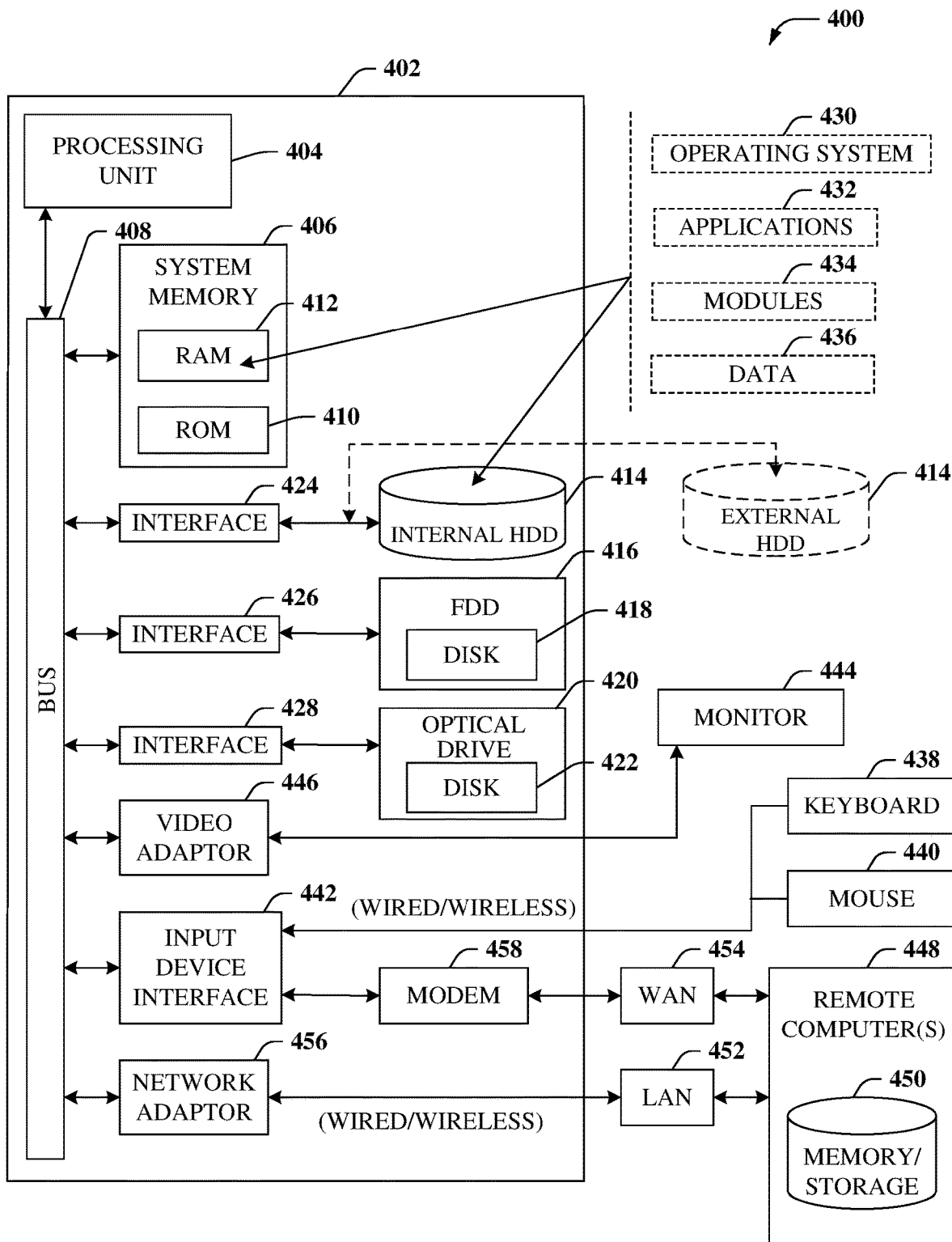
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part discovering a network topology of a WDM network having reconfigurable optical add-drop multiplexor nodes (ROADMs) configured for operation in fiberoptic communications network, identifying operational parameters of OADM nodes, and applying a machine learning approach to train a model based on observations of WDM network performance in view of the discovered topology and operational parameters. The trained model may be used to identify and/or otherwise recommend a WDM cross-frequency network path. A configuration of the WDM, including operating channels and/or bandwidth may be determined according to the trained model to address a communication requirement.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
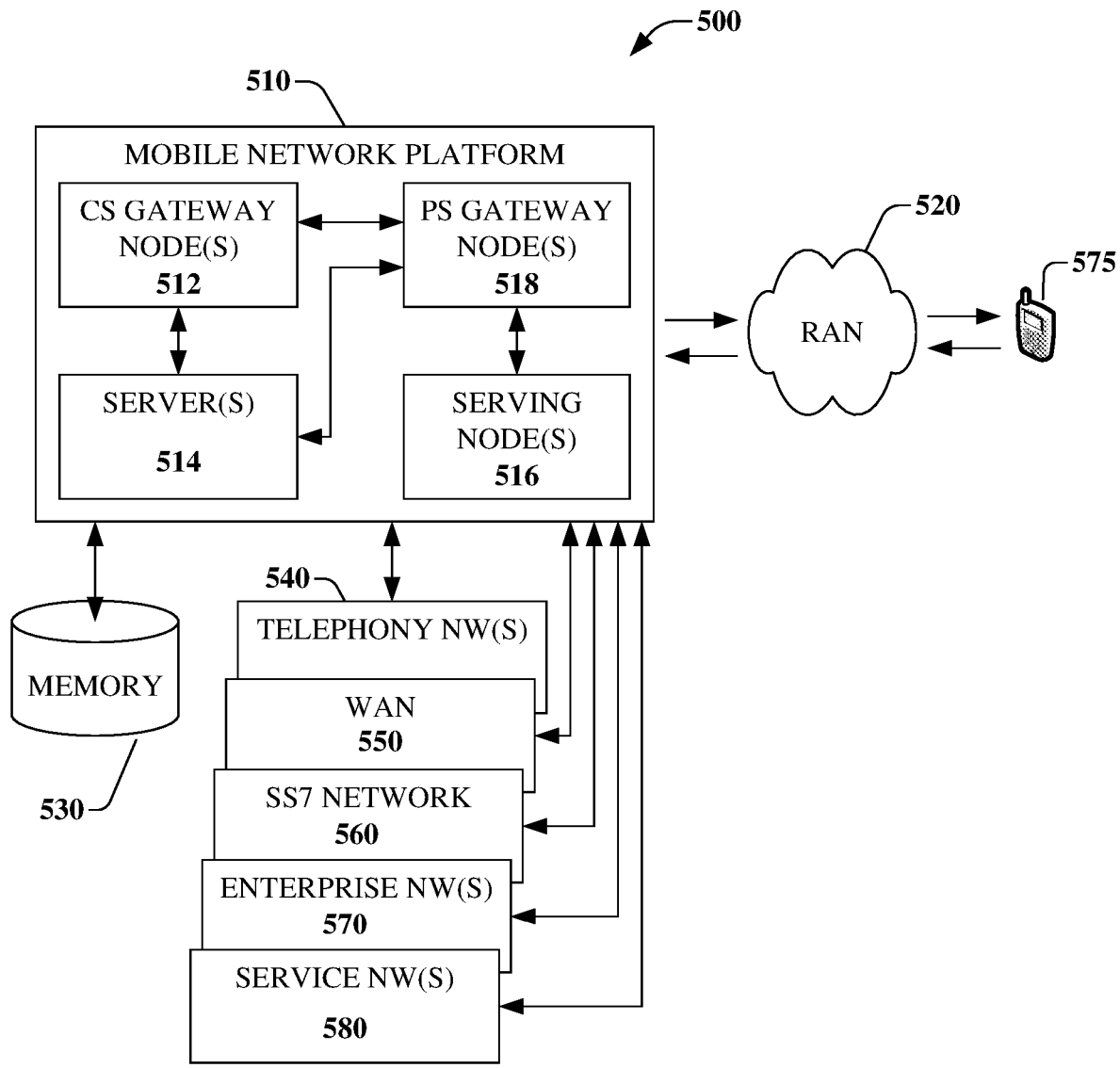
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part discovering a network topology of a WDM network having reconfigurable optical add-drop multiplexor nodes (ROADMs) configured for operation in fiberoptic communications network, identifying operational parameters of OADM nodes, and applying a machine learning approach to train a model based on observations of WDM network performance in view of the discovered topology and operational parameters. The trained model may be used to identify and/or otherwise recommend a WDM cross-frequency network path. A configuration of the WDM, including operating channels and/or bandwidth may be determined according to the trained model to address a communication requirement.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
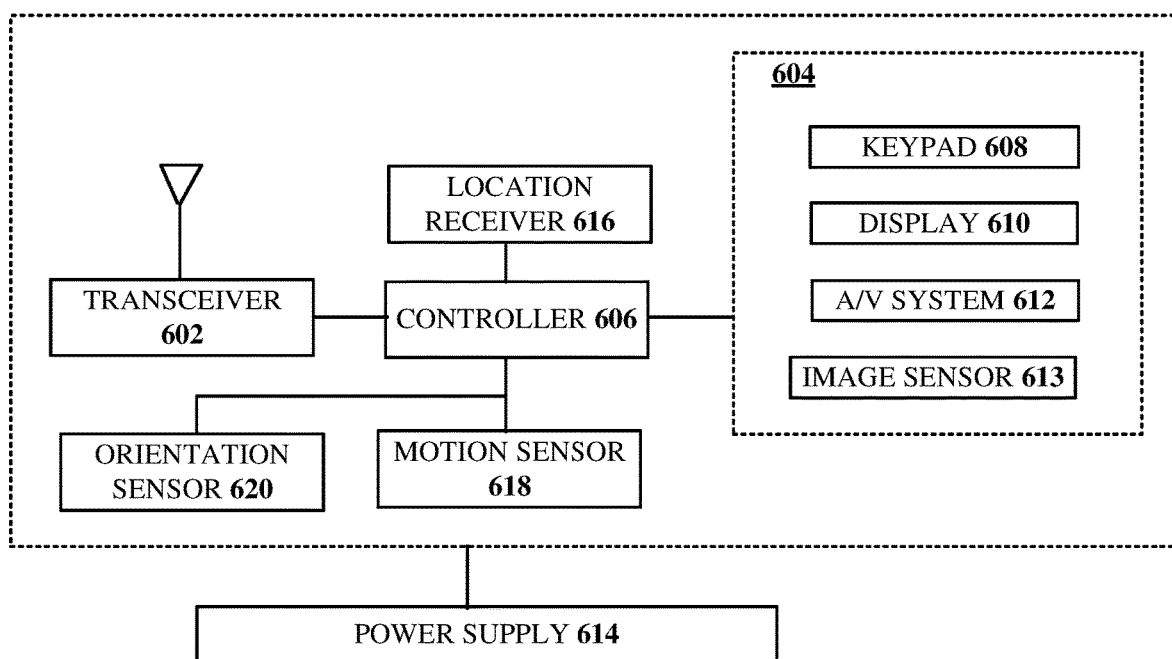
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part discovering a network topology of a WDM network having reconfigurable optical add-drop multiplexor nodes (ROADMs) configured for operation in fiberoptic communications network, identifying operational parameters of OADM nodes, and applying a machine learning approach to train a model based on observations of WDM network performance in view of the discovered topology and operational parameters. The trained model may be used to identify and/or otherwise recommend a WDM cross-frequency network path. A configuration of the WDM, including operating channels and/or bandwidth may be determined according to the trained model to address a communication requirement.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

It is understood that certain portions of optical fiber spectra, such as the C and L band spectrum are very precious in metro and core networks. According to the illustrative techniques disclosed herein, such as the machine learning and/or WDM path design algorithms the WDM controller, e.g., the SDD controller, facilitates an efficient utilization of available WDM spectrum. For example, a utilization of DWDM spectrum of an optical waveguide communication system may be enhanced and/or otherwise maximized by incorporating DWDM cross frequency channel network patterns as may be recommended for a DWDM network path solution. Beneficially, the cross-frequency channel network patterns may preserve and/or otherwise minimize revenue loss due to network non-availability of a same-frequency channel between the source and destination of a WDM link.

It is envisioned that the machine learning and/or WDM network planning algorithms disclosed herein may be implemented in whole or in part within a WDM controller, such as the example SDD controller. Alternatively, or in addition, one or more of the machine learning and/or WDM network planning algorithms may be implemented din whole or in part on other systems, such that any WDM network configuration and/or path may be implemented by the WDM controller.

Beneficially, the techniques disclosed herein may save operation expenditure and reduce network down time, e.g., by predicting DWDM cross frequency channel network pattern and recommending smart cross frequency channel DWDM network paths. It is understood that the WDM controller and/or other supporting machine learning and/or WDM network planning systems may contribute to establishing a data store, e.g., a database, that may be mined to create and/or otherwise enhance DWDM operation and/or planning intelligence. For example, an application of such intelligence may be beneficial to adapt a WDM network for any DWDM cross frequency channel network communication. Accordingly, the various techniques disclosed herein, such as an intelligent WDM controller, may be used to build a knowledge base that supports an efficient utilization of both C and L band spectra.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component." "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset." "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber." "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   discovering, by a processing system including a processor, a network topology of a wavelength division multiplexing (WDM) domain of an optical fiber communication system, the WDM domain comprising a plurality of optical-add-drop multiplexor (OADM) devices configured for simultaneously transporting a plurality of independent light signals across a single optical fiber network;
   obtaining, by the processing system, a plurality of observations of operation of the WDM domain configured to transport a plurality of communication channels via at least one OADM device of the plurality of OADM devices;
   identifying, by the processing system, an optical fiber communication link requirement for an optical fiber communication link between a source end and a destination end; and
   configuring, by the processing system, a WDM network of the WDM domain to obtain a configured WDM network according to the optical fiber communication link requirement and according to the plurality of observations, wherein the configured WDM network comprises the at least one OADM device of the plurality of OADM devices configured to provide a WDM cross-frequency network path of the configured WDM network by using a trained machine learning model based on the plurality of observations of operations of the WDM domain in view of the discovered network topology and operation parameters.

2. The method of claim 1, wherein the configuring the WDM network further comprises:
   selecting, by the processing system, the at least OADM of the plurality of OADMs.

3. The method of claim 2, wherein the configuring the WDM network further comprises:
   selecting, by the processing system, an associated pair of WDM channels of the WDM cross-frequency network path.

4. The method of claim 3, wherein WDM channels of the WDM cross-frequency network path reside within one of an L-band, a C-band, or both of the associated pair of WDM channels.

5. The method of claim 1, wherein the obtaining the plurality of observations of operation of the WDM domain further comprises:
   applying, by the processing system, machine learning to the plurality of observations.

6. The method of claim 1, wherein the network topology comprises one of first distances between pairs of OADM devices of the plurality of OADM devices.

7. The method of claim 6, wherein the network topology further comprises a plurality of gain profiles of the optical fiber communication link.

8. The method of claim 1, further comprising:
   calculating, by the processing system, a reachability of the destination end of the optical fiber communication link.

9. The method of claim 1, wherein the identifying the optical fiber communication link requirement further comprises forecasting demand for access to the optical fiber communication link.

10. The method of claim 9, further comprising:
    obtaining, by the processing system, historical network traffic patterns of the WDM domain, wherein the forecasting is based on historical WDM cross-frequency channel network patterns.

11. The method of claim 9, further comprising:
    identifying, by the processing system, a future event; and
    estimating, by the processing system, a network traffic pattern of the WDM domain, wherein the forecasting is based on historical WDM cross-frequency channel network patterns.

12. A device, comprising:
    a processing system including a processor; and
    a memory that stores executable instructions that, when executed by the processing system, facilitate performance of operations, the operations comprising:
    discovering a network topology of wavelength division multiplexing (WDM) domain of an optical fiber communication system, the WDM domain comprising a plurality of optical-add-drop multiplexor (OADM) devices configured for simultaneously transporting a plurality of independent light signals across a single optical fiber network;
    observing operation of the WDM domain, to obtain a plurality of observations, wherein a WDM network of the WDM domain is configured to transport a plurality of communication channels via at least one OADM device of the plurality of OADM devices;
    determining an optical fiber communication system requirement for an optical fiber communication link between a source end and a destination end; and
    configuring the WDM network to obtain a configured WDM network according to the optical fiber communication system requirement and according to the plurality of observations, wherein the configured WDM network comprises the at least one OADM device of the plurality of OADM devices configured to provide a WDM cross-frequency network path of the configured WDM network by using a trained machine learning model based on the plurality of observations of operations of the WDM domain in view of the discovered network topology and operation parameters.

13. The device of claim 12, wherein the configuring the WDM network further comprises:

selecting, by the processing system, the at least OADM of the plurality of OADMs.

14. The device of claim 13, wherein the configuring the WDM network further comprises:
   selecting an associated pair of WDM channels of the WDM cross-frequency network path.

15. The device of claim 12, wherein the observing to obtain the plurality of observations of operation of the WDM domain further comprises:
   applying machine learning to the plurality of observations.

16. The device of claim 12, wherein the operations further comprise:
   learning WDM cross-frequency channel network patterns to obtain learned usage patterns, wherein the determining the optical fiber communication system requirement is based on the learned usage patterns.

17. The device of claim 12, wherein the determining the optical fiber communication system requirement for the optical fiber communication link between the source end and the destination end further comprises forecasting a demand.

18. A non-transitory machine-readable medium, comprising-storing executable instructions that, when executed by a processing system including a processor, causes the processor to facilitate performance of operations, the operations comprising:
   identifying network elements of a wavelength division multiplexing (WDM) domain of an optical waveguide communication system, the WDM domain including a plurality of optical-add-drop multiplexor (OADM) devices;
   observing operation, to obtain a plurality of observations, of the WDM domain configured to deliver communication services configured for simultaneously transporting a plurality of independent signals across a network of single optical waveguides;
   determining a demand for optical waveguide communication services; and
   configuring a WDM network of the WDM domain to obtain a configured WDM network according to the demand for optical waveguide communication services and according to the plurality of observations, wherein the configured WDM network comprises at least one OADM device of the plurality of OADM devices configured to provide a WDM cross-frequency network path of the configured WDM network by using a trained machine learning model based on the plurality of observations of operations of the WDM domain in view of a network topology of the WDM domain and operation parameters.

19. The non-transitory machine-readable medium of claim 18, wherein the operations further comprise:
   storing a record of the observing of the operation of the WDM domain to obtain a stored record of observations, wherein the configuring the WDM network is further based on the stored record of observations.

20. The non-transitory machine-readable medium of claim 18, wherein the operations further comprise:
   systematically operating, during an evaluation period, the WDM domain according to a schedule of WDM resources, wherein the observing operation of the WDM domain comprises the evaluation period.

* * * * *

UNITED STATES PATENT AND TRADEMARK OFFICE
CERTIFICATE OF CORRECTION

| | | |
|---|---|---|
| PATENT NO. | : 12,212,903 B2 | Page 1 of 1 |
| APPLICATION NO. | : 18/061681 | |
| DATED | : January 28, 2025 | |
| INVENTOR(S) | : Mritunjay Pandey et al. | |

It is certified that error appears in the above-identified patent and that said Letters Patent is hereby corrected as shown below:

On the Title Page

Item (73) Second Assignee city name, delete "Karnataka" and insert --Bangalore--.

Signed and Sealed this
Fourth Day of March, 2025

Coke Morgan Stewart
*Acting Director of the United States Patent and Trademark Office*